US012614244B2

(12) United States Patent
Rovder et al.

(10) Patent No.: US 12,614,244 B2
(45) Date of Patent: Apr. 28, 2026

(54) METHODS FOR GENERATING AN UNDISTORTED IMAGE FROM A DISTORTED ORIGINAL IMAGE OF A GRAPHICAL REPRESENTATION

(71) Applicant: Powerful Medical s.r.o., Bratislava (SK)

(72) Inventors: Simon Rovder, Tomášov (SK); Martin Herman, Bratislava (SK); Robert Herman, Bratislava (SK); Viktor Jurášek, Bratislava (SK); Timotej Paluš, Bratislava (SK)

(73) Assignee: Powerful Medical s.r.o., Šamorín (SK)

( * ) Notice: Subject to any disclaimer, the term of this patent is extended or adjusted under 35 U.S.C. 154(b) by 161 days.

(21) Appl. No.: 18/280,116

(22) PCT Filed: Mar. 2, 2022

(86) PCT No.: PCT/EP2022/055201

§ 371 (c)(1),
(2) Date: Sep. 1, 2023

(87) PCT Pub. No.: WO2022/184740

PCT Pub. Date: Sep. 9, 2022

(65) Prior Publication Data

US 2024/0144417 A1 May 2, 2024

(30) Foreign Application Priority Data

Mar. 4, 2021 (EP) ..................................... 21160796

(51) Int. Cl.
*G06T 3/18* (2024.01)
*G06T 7/33* (2017.01)

(52) U.S. Cl.
CPC ................ *G06T 3/18* (2024.01); *G06T 7/337* (2017.01)

(58) Field of Classification Search
CPC . G06T 3/18; G06T 7/337; G06T 2207/10008; G06T 2207/20021; G06T 2207/30176; G06T 2210/41; A61B 5/338
See application file for complete search history.

(56) References Cited

U.S. PATENT DOCUMENTS

| | | | | |
|---|---|---|---|---|
| 6,641,053 | B1 * | 11/2003 | Breidenbach | G06T 1/0071 |
| | | | | 235/494 |
| 2017/0124761 | A1 * | 5/2017 | Michel | G06T 3/20 |
| 2018/0033155 | A1 * | 2/2018 | Jia | G06T 7/33 |

OTHER PUBLICATIONS

Garg, D. K., et al.(2012) "ECG Paper Records Digitization through Image Processing Techniques", International Journal of Computer Applications, 13:35-38. (Year: 2012).*

(Continued)

*Primary Examiner* — Michael Le
(74) *Attorney, Agent, or Firm* — Kagan Binder, PLLC

(57) ABSTRACT

Embodiments relate to a method for generating an image comprising a graphical representation. The method includes determining a transformation relationship for a unit cell of a graphical representation of an original image. The transformation relationship is based on position information of grid vertices of the unit cell of the original image graphical representation and position information of grid vertices of a unit cell of a reference grid arrangement of the image to be generated. The method further includes determining position information of a one or more pixels of the unit cell of the original image graphical representation based on the transformation relationship. The method further includes applying data information sampled at the one or more pixels of the unit cell of the original image graphical representation to one or more pixels of the unit cell of the reference grid arrangement.

16 Claims, 14 Drawing Sheets

(56)                  References Cited

OTHER PUBLICATIONS

Chen, J. C., et al. (2020) "Multl-iead Data Extraction Method of ECGS Waveform Based on Mobile Device Application", International Symposium on Computer, Consumer and Control (IS3C}, IEEE, pp. 557-560 (Year: 2020).*

Garg, D. K., et al. (2012) "ECG Paper Records Digitization through Image Processing Techniques", International Journal of Computer Applications, 13:35-38.

Chen, J.C., et al. (2020) "Multi-lead Data Extraction Method of ECG Waveform Based on Mobile Device Application", International Symposium on Computer, Consumer and Control (IS3C), IEEE, pp. 557-560.

* cited by examiner

221

Preprocessed Points

Rotated Augmented Input Points

500

510
Rotating a point pattern

520
Preforming an edge determination

530
Forming a set of potential edges

540
Detecting clusters

550
Establishing expected edge data points

560
Selecting clusters of data points

570
Designating the potential edges

580
Constructing the pattern of shapes

METHODS FOR GENERATING AN UNDISTORTED IMAGE FROM A DISTORTED ORIGINAL IMAGE OF A GRAPHICAL REPRESENTATION

PRIORITY CLAIM

This application claims priority to International Application No. PCT/EP2022/055201, filed Mar. 2, 2022, which claims priority to European Application No. 21160796.5, filed Mar. 4, 2021, wherein the contents of said applications are incorporated herein by reference in their entireties.

The embodiments described herein relate to methods for generating an image of a graphical representation and a computer-readable storage medium.

BACKGROUND

An electrocardiogram is a graph or graphical representation displaying information related to electrical activity (e.g. electrical potential) of the heart. Electrical signals are obtained from several (e.g. 12) lead electrodes placed on a patient's skin, and measured over a period of time, e.g. 10 s. Electrical signals obtained from the lead electrodes may be displayed or recorded as a graphical representation of voltage (mV) on the y-axis and time (ms) on the x-axis. Today, digital ECGs may be used in hospitals. However, most ECGs from the past have been recorded and printed out on grid paper. Sharing of ECG information and carrying out ECG research from paper-based ECGs is difficult and may hamper retrospective studies. Furthermore, the process of converting paper-form waveform recordings, such as electrocardiogram (ECG) print-outs, into accurate digital recordings is challenging. A paper-based ECG recording may be bent in many ways, such as being tilted, turned, skewed, and with non-linear and linear distortions. The process of obtaining accurate digital images of ECG waveforms is difficult, because paper may be distorted in many ways. Even if a photograph is taken of the paper-based recording, undistorting ECG photographs may be difficult because the distortion of the ECG within the image is a complex and irregular transformation.

SUMMARY

Various embodiments relate to providing methods for generating an image of a graphical representation. The methods and arrangements provide an improved process for generating undistorted graphical representations, such as ECG waveforms, from paper-form recordings.

Various embodiments relate to a method for generating an image comprising a graphical representation. The method includes determining a transformation relationship for a unit cell of a graphical representation of an original image, the original image graphical representation comprising a grid arrangement comprising a plurality of unit cells. The transformation relationship is based on position information of grid vertices of the unit cell of the original image graphical representation and position information of grid vertices of a unit cell of a reference grid arrangement of the image to be generated. The method includes determining position information of one or more pixels of the unit cell of the original image graphical representation based on the transformation relationship. The method further includes applying data information sampled at the one or more pixels of the unit cell of the original image graphical representation to one or more pixels of the unit cell of the reference grid arrangement.

BRIEF DESCRIPTION OF THE DRAWINGS

The foregoing and other features of the present disclosure will become more fully apparent from the following description and appended claims, taken in conjunction with the accompanying drawings. It is understood that the accompanying drawings depict only several embodiments in accordance with the present disclosure and are, therefore, not to be considered limiting of its scope. The disclosure will be described with additional specificity and detail through use of the accompanying drawings, such that the advantages of the present disclosure can be more readily ascertained, in which:

DETAILED DESCRIPTION

Figure 1A:
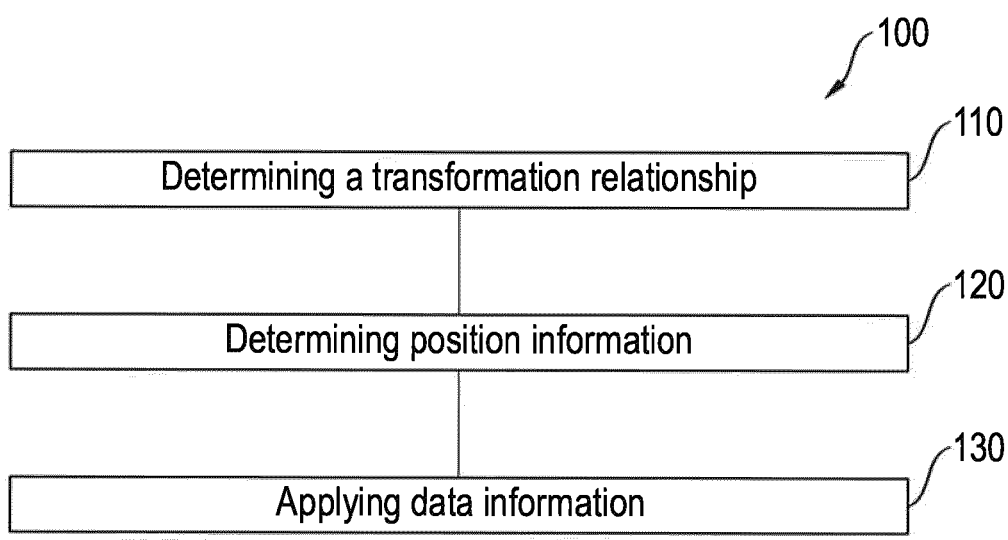
FIG. 1A shows a flow chart of a method for generating an image comprising a graphical representation.

In the following detailed description, reference is made to the accompanying drawings that show, by way of illustration, specific embodiments in which the claimed subject matter may be practiced. These embodiments are described in sufficient detail to enable those skilled in the art to practice the subject matter. It is to be understood that the various embodiments, although different, are not necessarily mutually exclusive. The terms "embodiment," "example embodiment," "exemplary embodiment," and "present embodiment" do not necessarily refer to a single embodiment, although they may, and various example embodiments may be readily combined and/or interchanged without departing from the scope or spirit of example embodiments. For example, a particular feature, structure, or characteristic described herein, in connection with one embodiment, may be implemented within other embodiments without departing from the spirit and scope of the claimed subject matter. References within this specification to "one embodiment" or "an embodiment" mean that a particular feature, structure, or characteristic described in connection with the embodiment is included in at least one implementation encompassed within the present description. Therefore, the use of the phrase "one embodiment" or "in an embodiment" does not necessarily refer to the same embodiment. In addition, it is to be understood that the location or arrangement of individual elements within each disclosed embodiment may be modified without departing from the spirit and scope of the claimed subject matter. The following detailed description is, therefore, not to be taken in a limiting sense, and the scope of the subject matter is defined only by the appended claims, appropriately interpreted, along with the full range of equivalents to which the appended claims are entitled. In the drawings, like numerals refer to the same or similar elements or functionality throughout the several views, and that elements depicted therein are not necessarily to scale with one another, rather individual elements may be enlarged or reduced in order to more easily comprehend the elements in the context of the present description.

The terms "a," "an," and "the" may include singular and plural references. Furthermore, as used in the present disclosure and the appended claims, the words "and/or" may refer to and encompass any and all possible combinations of one or more of the associated listed items. As used in the present disclosure, the phrase "A and/or B" means (A), (B), or (A and B). As used in the present disclosure, the phrase "A, B, and/or C" means (A), (B), (C), (A and B), (A and C), (B and C), or (A, B and C). As used in the present disclosure, term "or" when used in the phrase "A, B, or C" means that (A) does not exclude (B) and (C), (B) does not exclude (A) and (C), and (C) does not exclude (A) and (B).

The "method for generating an image comprising a graphical representation" of the present invention preferably embodies method (100) for producing an undistorted image (112) from a distorted original image (101) comprising a graphical representation as described herein. Indeed, the graphical representation may be distorted as described herein. Accordingly, all embodiments described in connection with a method for generating an image comprising a graphical representation of the present invention, apply, mutatis mutandis, to a method for producing an undistorted image from a distorted original image comprising a graphical representation as described herein.

Thus, the present invention relates to a method (100) for producing an undistorted image (112) from a distorted original image (101) comprising a graphical representation (102) on an original grid arrangement (104) with a plurality of unit cells (107) that forms a background onto which graphical information is recorded, based on a reference grid arrangement (105) comprising a plurality of undistorted unit cells (106) creatable on a blank image (112), the method comprising:

creating the reference grid arrangement (105) by associating the plurality of undistorted unit cells (106) on the blank page with corresponding unit cells (107) of the original grid arrangement (104) derivable from the distorted original image (101);

repeating for each unit cell (106), referred to as current unit cell, of the reference grid arrangement (105):

determining a transformation relationship based on position information of grid vertices (109) of the current unit cell (106), referred to as target unit cell, and position information of grid vertices (108) of a corresponding unit cell (107), referred to as source unit cell, of the original grid arrangement (104) of the original image graphical representation (102);

determining position information in a source unit cell (107) corresponding to one or more pixels of the current unit cell (106), referred to as target unit cell, using the transformation relationship; and supplying data information sampled in the source unit cell (107), using the position information determined in the source unit cell (107), to the corresponding one or more pixels of the target unit cell to produce the undistorted image (112).

Preferably, in the method of the present invention, the position information determinable in the source unit cell (107) corresponding to a pixel of the one or more pixels of the current unit cell (106) comprises a location of a single pixel in the original image graphical representation (102).

Preferably, in the method of the present invention, the original image (101) is an image of a paper-based graphical representation.

More preferably, in the method of the present invention, the original image graphical representation (102) comprises a waveform represented on the original grid arrangement (104), wherein the waveform comprises a waveform representing a measurable parameter, such as an electrocardiogram waveform.

Preferably, in the method of the present invention, the reference grid arrangement (105) and the original grid arrangement (104) of the original image (101) are of the same size.

Preferably, in the method of the present invention, the position information of each pixel of the unit cell of the original image graphical representation is determined based on a transformation of the position information of a corresponding pixel of the unit cell of the reference grid arrangement using the transformation relationship.

Preferably, in the method of the present invention, the transformation relationship is determined based on a mapping of the position information of the grid vertices of the unit cell of the reference grid arrangement to the position information of grid vertices of the unit cell of the original image graphical representation.

Preferably, the method of the present invention comprises repeating the processes of determining a transformation relationship and applying sampled data to each unit cell of a plurality of unit cells of the reference grid arrangement to form the undistorted graphical representation.

Preferably, in the method of the present invention, the sampled data information comprises color value information representing waveform data of the original image graphical representation.

Preferably, the method of the present invention comprises determining position information of the plurality of grid vertices (108) of the original image graphical representation, wherein determining the position information comprises:

generating a two-dimensional scatter plot of dots, wherein the dots of the scatter plot represent detected grid vertices of the grid arrangement (104) of the original image graphical representation;

determining, for each dot of the scatter plot, a set of edges for forming a unit cell of the grid arrangement (104); and constructing, for each dot of the scatter plot, a unit cell of the grid arrangement (104) based on the determined set of edges.

More preferably, in the method of the present invention, the dots of the scatter plot are rotated and flipped about an axis of the scatter plot before the set of edges for each dot of the scatter plot are determined.

More preferably, in the method of the present invention, determining the set of edges for each dot of the scatter plot comprises:

selecting a predefined number of dots neighboring a reference dot;

generating an edge between the reference dot and each selected dot;

selecting edges for forming a unit cell of the grid arrangement (104) based on a probability assigned to the generated edges.

Even more preferably, in the method of the present invention, selecting the edges for forming a unit cell comprises generating a plot comprising a plurality of edge data points, each edge data point representing parameters describing a relative position of the generated edge with respect to the reference dot; and using a probability classifier to identify clusters of edge data points from the plurality of edge data points and to assign a probability to each edge of the identified cluster.

Even more preferably, in the method of the present invention, constructing a unit cell comprises tracing, starting with each reference dot, a path of a desired unit cell along the selected edges, wherein the selected edges are maximum likelihood edges for forming the unit cell; the method further comprising constructing a network of unit cells with unit cells having a closed path.

Even more preferably, the method of the present invention comprises determining the largest network of unit cells for forming the grid arrangement using a breadth-first search algorithm;

identifying missing unit cells from the grid arrangement; and determining position information of vertices of the missing unit cells using linear regression.

The present invention also relates to a computer-readable storage medium, comprising computer-readable instructions, which when executed by a computer, causes the computer to perform the method of the present invention.

FIG. 1A shows a flow chart of a method 100 for generating an image comprising a graphical representation.

The method 100 includes determining (in process 110) a transformation relationship for a unit cell of a graphical representation of an original image. The original image graphical representation includes a grid arrangement including a plurality of unit cells. The transformation relationship is based on position information of grid vertices of the unit cell of the original image graphical representation and position information of grid vertices of a unit cell of a reference grid arrangement of the image to be generated. The method 100 further includes determining (in process 120) position information of one or more pixels of the unit cell of the original image graphical representation based on the transformation relationship. The method 100 further includes applying (in process 130) data information sampled at the one or more pixels of the unit cell of the original image graphical representation to one or more pixels of the unit cell of the reference grid arrangement.

Figure 1B:
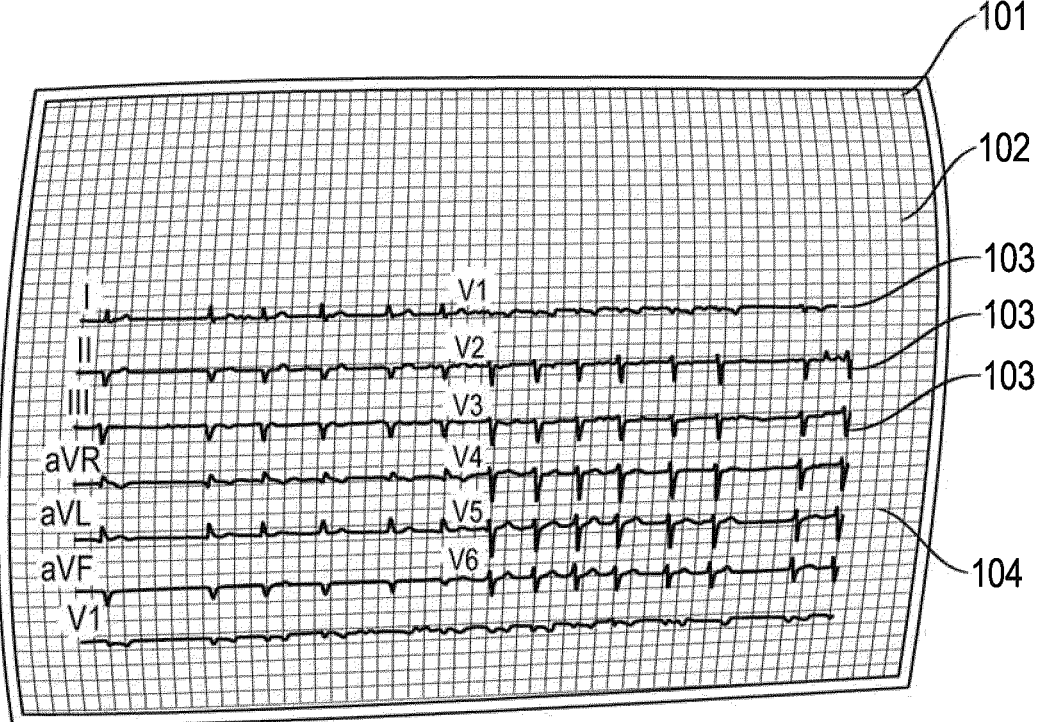
FIG. 1B shows an original distorted image of a graphical representation.

The method 100 relates to a method for generating (producing, or deriving) a graphical representation based on an original image (e.g. as shown in FIG. 1B) of the graphical representation which may be distorted. The graphical representation to be generated may be a final image with reduced, minimized, or almost-zero distortion. The term graphical representation may refer to and/or include a grid arrangement, or graph and/or a waveform represented on the grid arrangement. Additionally, or optionally, the graphical representation may further include other data, such as text, words, letters, numbers and/or handwritten markings. The method 100 may be applied to undistorting and/or transforming the distorted original image. The original image to be undistorted by the method 100 may be an image of a paper-based graphical representation, such as a digital scan, or a digital photograph of a paper-based graphical representation such as graph paper. The paper-based graphical representation may be a paper printout or paper chart of an ECG waveform.

FIG. 1B shows an original distorted image 101 of a graphical representation 102. The graphical representation 102 in the original image 101 may be referred to as the original image graphical representation 102. The graphical representation 102 includes at least one waveform 103 (e.g. one or more waveforms 103) represented on a grid arrangement 104. A grid arrangement may refer to a regular two-dimensional lattice of regularly repeating units cells. The grid arrangement may be a predictable or reference structure on which data information such as a waveform may be represented and evaluated. The grid arrangement may include a plurality of intersecting straight vertical, horizontal and/or angular grid lines forming the plurality of unit cells of the graphical representation 102. Alternatively, the grid arrangement may include a dot grid reference structure, for example. The original image 101 itself may be distorted. For example, since the paper-copy of the graphical representation may include tilts, folds, skewed regions, turns, non-linear and linear distortions, the image 101 of the paper-copy of the waveform may also include these distortions which may be represented in the image 101.

The image 101 may include an ECG waveform to be undistorted (or e.g. transformed, or e.g. processed) by the method 100. Although an ECG is used herein to explain these examples, it may be understood that the method 100 may be applied to any waveforms represented on grid arrangements, such as pressure measurements, blood pressure measurements, $CO_2$ measurements, measurements of chemical compounds, or any measureable parameter that may be represented on a regular grid arrangement, and/or even to any grid arrangements or grid paper without waveforms, and/or to any graphs, diagrams or drawings represented on a regular grid arrangement. Furthermore, although typical ECG grid arrangements are regular square-based grid arrangements, it may be understood that method 100 may apply to the undistortion of any regular grid arrangement having polygonal unit cells, such as parallelograms, diamonds, triangles, squares, rectangles, dot-grids.

Figure 1C:
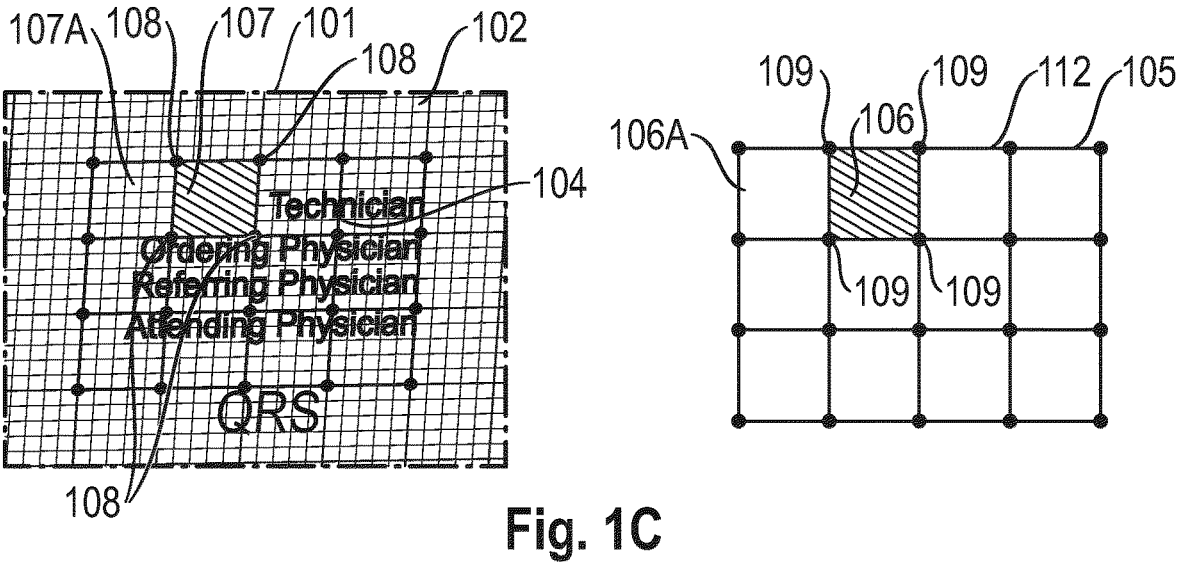
FIGS. 1C to 1E each show at least part of the method for generating a graphical representation.
Figure 1D:
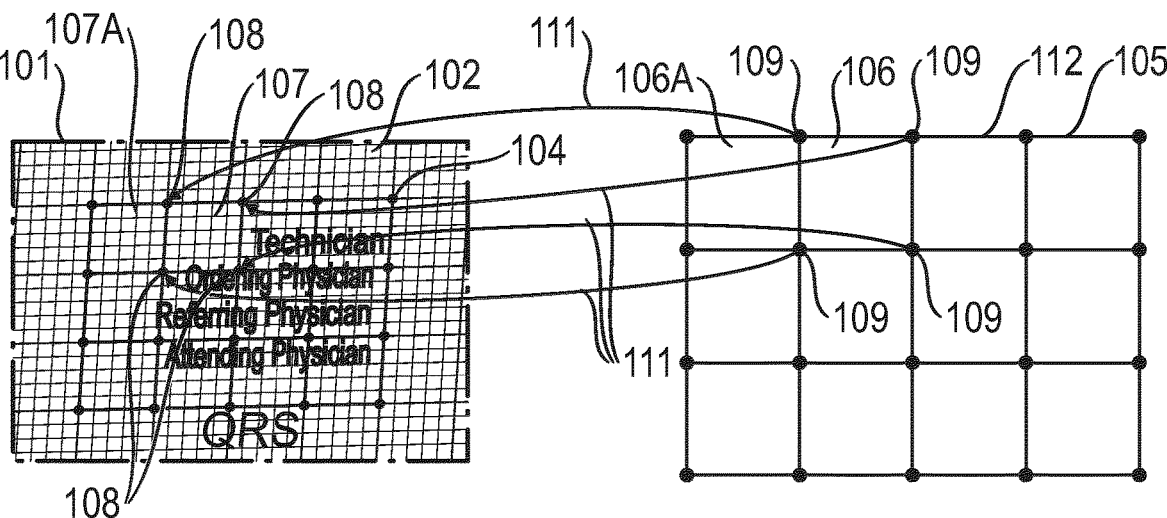
Figure 1E:
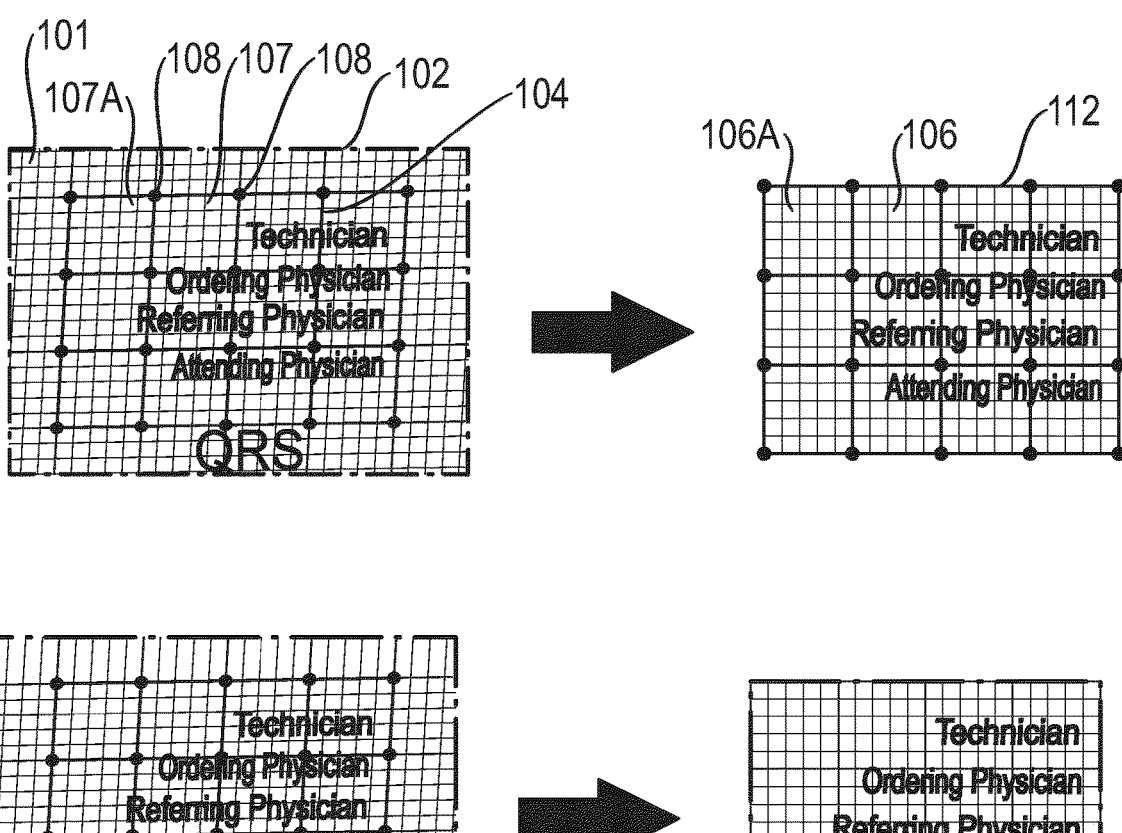

FIGS. 1C to 1E show at least part of the method 100 for generating a graphical representation. In each of the figures, the original (distorted image) is shown on the left. FIGS. 1C and 1D each show a reference grid arrangement 105 (undistorted template) on the right.

As shown in FIG. 1C, the reference grid arrangement 105 (on the right) may include a plurality of unit cells 106, 106A which are undistorted. Optionally, the plurality of unit cells may be arranged adjacently to each other in a two-dimensional array. As used herein, a unit cell 106 may be a regular and/or repeating unit of the grid arrangement. In ECGs, a single unit cell 106 may be a 5 mm×5 mm major square made up of a 5×5 array of 1 mm minor squares. On the x-axis, each major square may represent 0.20 sec (200 ms) intervals. On the y-axis, 10 mm, (10 minor squares, or 2 major squares) may represent 1 mV intervals. In these examples, the unit cell 106 may be, but is not limited to being, a major square (e.g. a square enclosed by major grid lines) of the grid arrangement. For example, the unit cell may be a major unit cell (e.g. on the scale of a single ECG square). Each major square may be enclosed within or defined by major grid lines, and may include an array (e.g. a 5×5 array) of minor squares, which may be enclosed within or defined by minor grid lines. A single unit cell 106 depicted by the shaded square is shown in FIG. 1C. The plurality of unit cells 106 of the reference grid arrangement 105 may form a regular lattice of orderly, repeating (tessellated) unit cells 106. The method 100 may include generating the reference grid arrangement 105, by a computer, wherein coordinate information of the grid vertices (also referred to as nodes, points, corners, or grid line intersections) of the reference grid arrangement are known or predetermined values used by the computer to generate the reference grid arrangement 105. A blank image 112 as the "template" for the undistorted rectangle may be created. The reference grid arrangement 105 may be a desired or ideal template of undistorted grid vertices. In this blank template, a square-based grid arrangement 105 may be created, and every square 106 of the rectangular grid arrangement 105 may have the same dimensions. For example, optionally, every unit cell 106 (or square) may include 64×64 pixels.

The reference grid arrangement 105 may be generated such that the portion of the grid arrangement 104 of the original image 101 to be undistorted and the reference grid arrangement 105 may correspond to each other. For example, they may have the same array dimensions. For example, they may both have the same number of grid vertices and/or the same array (or number) of unit cells. As shown in FIG. 1C, the original image graphical representation 102 may also include a grid arrangement 104 including a plurality of unit cells 107. However, the grid arrangement 104 and the plurality of unit cells 107 may be distorted. The method 100 uses an assumption that on a small scale, paper distortion may appear linear. A 4-corner method applied to undistorting the whole image may be insufficient for transforming ECGs accurately because they may assume that the paper in the photo is only tilted and turned by linear transformation, without considering non-linear distortions. The choice of size of the unit cell for a 4-corner process may improve the undistortion process. Using method 100, undistorting each respective square (or unit cell 107) of the ECG independent of the others and according to its own respective transformation relationship may compensate for the nonlinear nature of the paper distortion. The undistorted image may hence be constructed one square at a time.

Each (or a) unit cell 106 in the reference grid arrangement 105 may have a corresponding (or respective) unit cell 107 in the original image 101. As shown in FIGS. 1C and 1D, a 4-corner undistortion method may be applied to a corresponding unit cell pair 106, 107. The method 100 includes determining (or e.g. calculating, or e.g. producing) (in process 110) a transformation relationship for the unit cell 107 of the graphical representation 102 of an original image 101 and its corresponding unit cell 106 of the reference grid arrangement 105. In other words, a respective transformation relationship may be determined for each unit cell pair 106, 107 or 106A, 107A. The transformation relationship may include, or may be a transformation matrix. The transformation relationship may define a linear transformation. The transformation relationship is based on position information (also referred to as coordinate information) of grid vertices 108 of (or in) the unit cell 107 of the original image graphical representation 102 and position information of grid vertices 109 in a unit cell 106 of the reference grid arrangement 105.

As shown in FIG. 1D, the transformation relationship may be determined based on a mapping (represented by the arrows 111) of the position information of the grid vertices 109 of the unit cell 106 of the reference grid arrangement 105 to the position information of grid vertices 108 of the unit cell 107 of the original image graphical representation 102. Each point (or vertex, or corner) 109 of the unit cell 106 of the reference grid arrangement 106 may be mapped onto a corresponding or respective point (or vertex, or corner) 108 of the corresponding unit cell 107 of the original image 101. The transformation relationship may be determined based on the mapping for a plurality of points (e.g. all points, e.g. all four corners of a square, e.g. all vertices) of the unit cell.

The method 100 may map the undistorted image 112 onto the distorted image 101 as it is less complex than mapping the distorted image 101 onto the undistorted image 112. For each square (unit cell pair 106, 107), a transformation matrix may be computed that maps the corners of the undistorted image template 112 to its corners in the distorted image 101. Inputs into the undistortion algorithm of method 100 may include the original image 101 and coordinate pairs (e.g. XY coordinates) of the intersections 108 of major grid lines on the original image 101. These coordinates may be floating-point coordinates, meaning they may have sub-pixel accuracy.

After determining the transformation relationship for a unit cell pair 106, 107, the method 100 further includes determining (in process 120) position information of one or more (e.g. a plurality of) pixels of the unit cell 107 of the original image graphical representation 102 based on the transformation relationship. The position information (coordinates) of each pixel of the unit cell 107 of the original image graphical representation 102 may be determined based on a transformation of the position information of a corresponding pixel in the corresponding unit cell 106 of the reference grid arrangement 105 using the transformation relationship. For example, an empty pixel of the unit cell 106 of the reference grid arrangement 105 may be selected. After selecting the empty pixel, the pixel's coordinates may be transformed using the transformation matrix (determined by the 4-corner determination) of that particular unit cell 106. This transformation will yield the corresponding coordinates of the selected empty pixel in the corresponding unit cell 107 on the original image graphical representation 102.

After determining the position information of a pixel of the unit cell 107 of the original image graphical representation 102, the method 100 further includes applying (in process 130) data information sampled at the pixel of the unit cell 107 of the original image graphical representation 102 to its corresponding pixel of the unit cell 106 of the reference grid arrangement 105. For example, the method may include retrieving (or obtaining) data information at the pixel of the unit cell 107 and applying (transferring, copying, sending) the obtained data information to the corresponding pixel of the unit cell 106. In this way, data information from the distorted image may be sampled on the computed coordinates obtained from the transformation. The sampled data information may include color value information representing waveform data of the original image graphical representation 102. Thus, the pixel in the undistorted image 112 may be filled (or updated) with color value sampled from the distorted image 101. The same transformation relationship may be used for each pixel of the plurality of pixels of the unit cell 106 (e.g. in or with of the unit cell), and data information sampled at each of the plurality of pixels of the unit cell 107 of the original image graphical representation 102 may be applied respectively to its respective pixel of the plurality of pixels of the unit cell 106 of the reference grid arrangement 105.

The method 100 may further include repeating the processes of determining a transformation relationship for the plurality of unit cells 106 of the reference grid arrangement, such as for each (or e.g. every) unit cell 106 of the plurality of unit cells 106 of the reference grid arrangement 105, and applying sampled data from the pixels of each unit cell 107 of the original image to its respective or corresponding unit cell 106 of the reference grid arrangement 105, to eventually form a completed image 112 including an undistorted graphical representation. As shown in FIG. 1E, performing the processes on (all) the pixels within each unit cell pair 106, 107, generates an undistorted version of the unit cell of the distorted image. Repeating the processes for each unit cell of the plurality of unit cells generates an undistorted image 112 based on the original distorted image 101. The upper image shows the undistorted grid lines after repeating the process for each unit cell 106. The lower image shows the generated image without the reference grid arrangement.

Figure 1F:
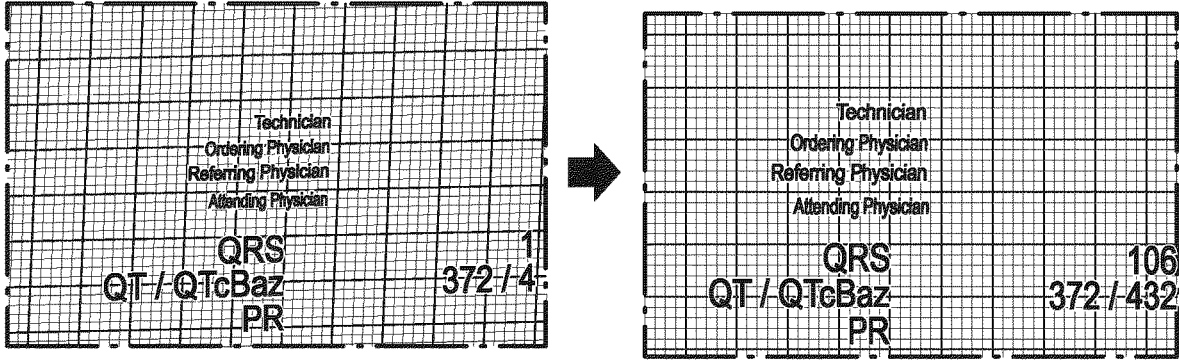
FIG. 1F shows a comparison between the originally distorted image and the generated undistorted image.

FIG. 1F shows a comparison between the originally distorted image (left) and the generated undistorted image (right). The generated image has fewer and/or minimal distortions due to tilts, bumps, turns, skews, and non-linear and linear distortions.

Figure 1G:
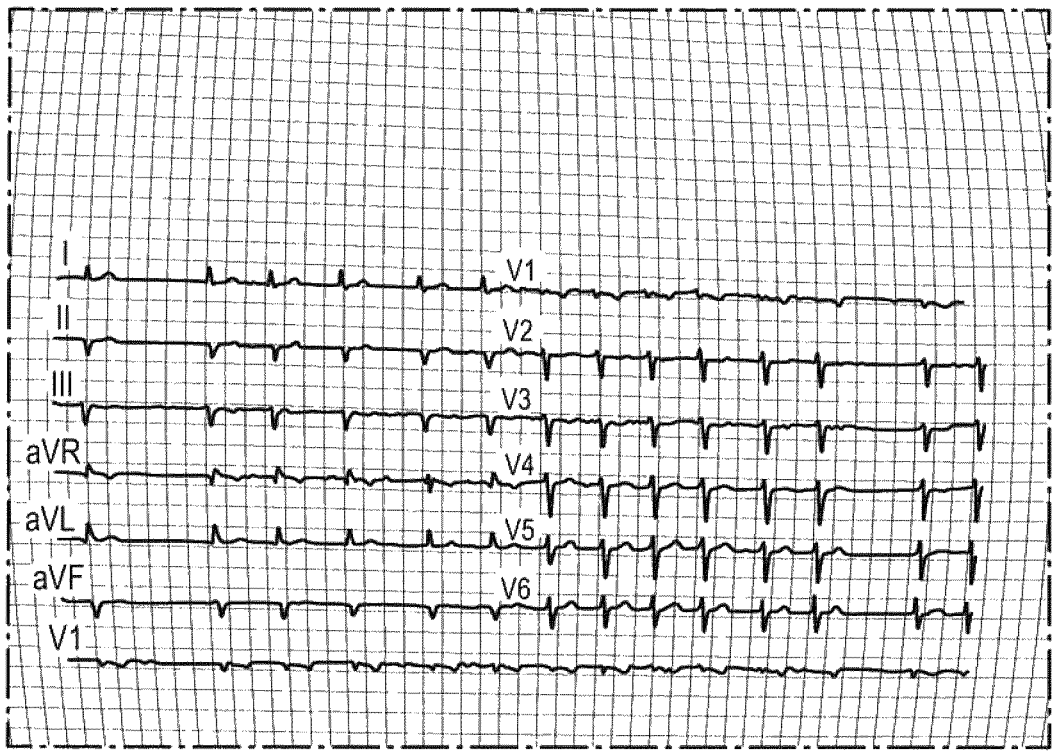
FIG. 1G shows an image comprising a graphical representation that has been undistorted using a conventional scanner app versus an image undistorted by the method.
Figure 1G:
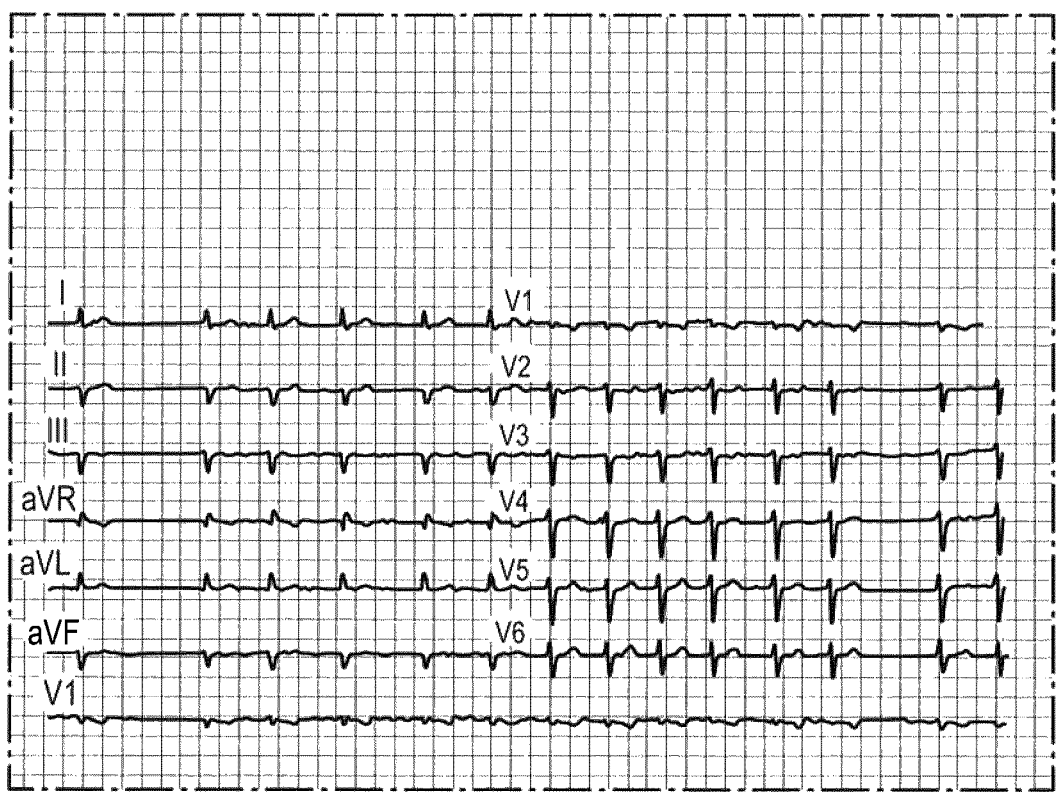

FIG. 1G shows an image comprising a graphical representation that has been undistorted using a conventional scanner app (above) versus an image (lower) undistorted by the method described in connection with method 100, 200. As shown the lower image comprises a more accurate grid with significantly reduced gridline and waveform distortions compared to a reference or ideal grid arrangement.

Figure 2A:
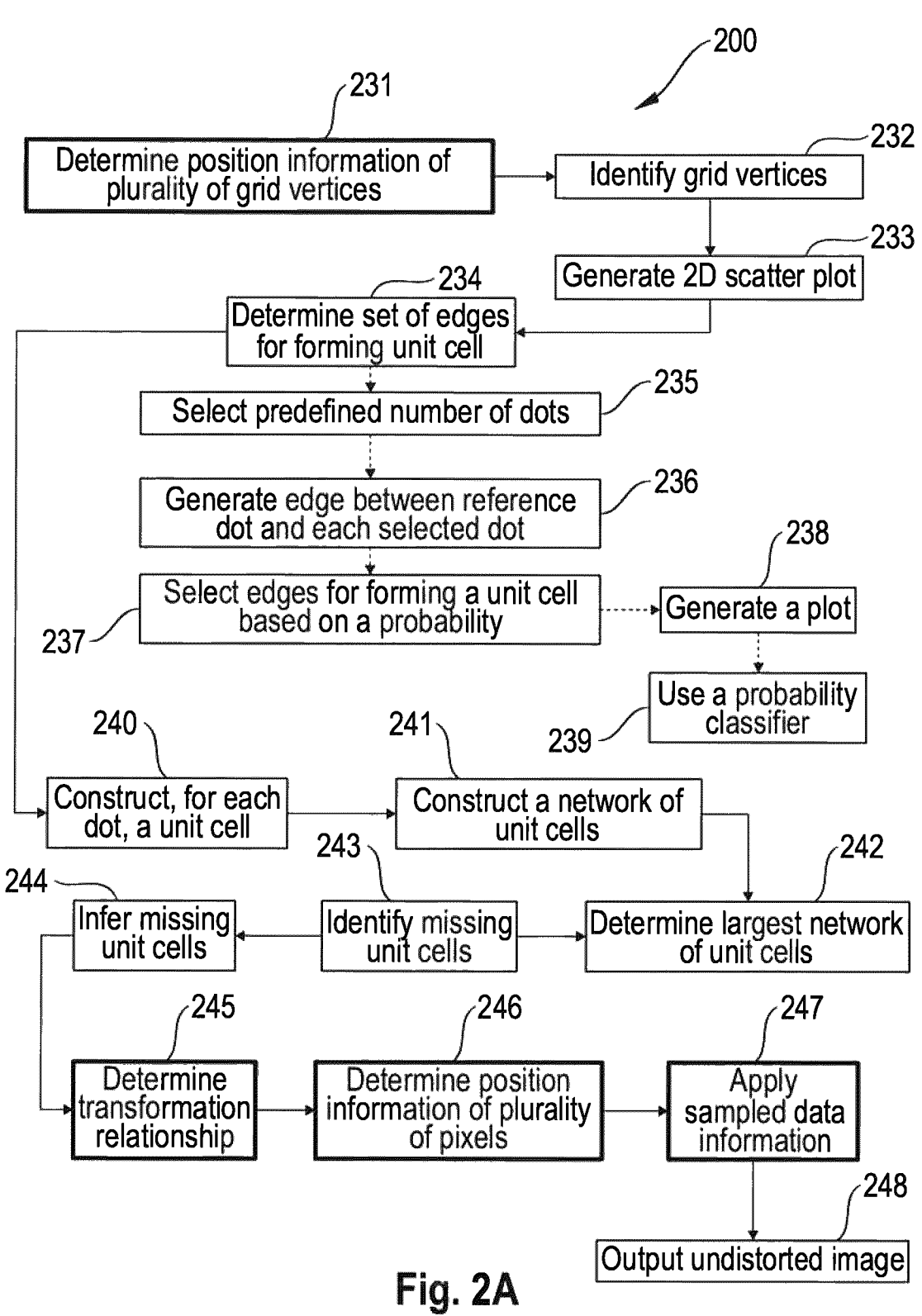
FIG. 2A shows a flow chart of the method for generating an image comprising a graphical representation.

FIGS. 2A to 2X discloses a method 200 for generating an image comprising a graphical representation according to various examples. Method 200 may include one or more or all of the features already described in connection with method 100 of FIGS. 1A to 1E.

FIG. 2A shows a flow chart of the method 200 for generating a graphical representation. Method 200 may include determining (in process 231) position information of the plurality of grid vertices 108 of the original image graphical representation 102. Unlike the reference grid arrangement 105, the original image 101 may be distorted in an unpredictable manner. Thus, the position information of the plurality of grid vertices 108, such as the coordinates of grid vertices (e.g. major grid line intersections) of the distorted grid arrangement 102 of the original image 101 may be determined from the original image so as to determine the transformation relationship.

Determining position information of the plurality of grid vertices of the graphical representation of the original image may include identifying or detecting (in process 232) grid vertices using a grid vertices detection process. The grid vertices detection process may include using or executing a dotter algorithm, such as optionally, an artificial neural work process or a convolutional network (CNN) process. Using a CNN process, such as u-Net (shown in FIG. 4A), the CNN may be trained to detect grid vertices (e.g. major grid line intersections) in the original distorted image 101.

Figure 2B:
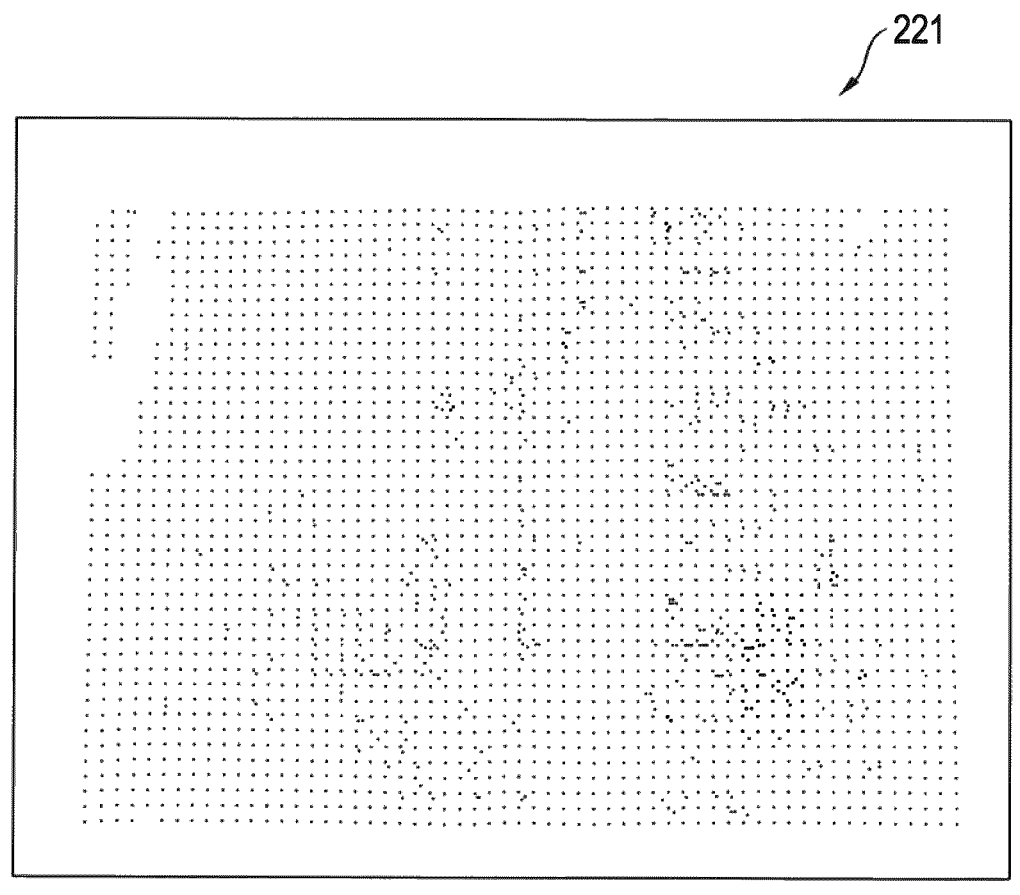
FIG. 2B shows an image of grid vertices identified by a grid vertices detection process.

FIG. 2B shows an image 221 of grid vertices 108 (or dots) of the original image identified by the grid vertices detection process. However, not all of the identified grid vertices may be actual (accurately identified) grid vertices of the original image 101. The method 200 may include processing (or scanning) the input image of dots shown in FIG. 2B, which may be a grayscale image mask, where the points are represented as bright spots on a black background which represents nothing or space. The method 200 may further include extracting points from the image of dots. For example, the image of dots may be thresholded for RGB values over a certain value, e.g. over 150. This may form white patches on a black back ground. Furthermore, a location (e.g. position information, or e.g. coordinate information) of each patch may be determined as a point. Optionally, the location may be a midpoint of the patch, an average location, or a computed weighted average location of the spot, weighing the pixel location by their intensity in the mask. After determining the locations of the points, a predefined number of the largest points may be detected, and the rest removed. The predefined number may be a number of expected points on the grid arrangement (or graph paper). For example, if a 60×42 array of unit cells is expected on the grid arrangement, 2520 points may be expected. Thus, the top 2520 largest points may be determined and the rest may be removed. The determined largest points may then be passed to the next stage. The output at this stage may include (or may be) float coordinates of points in an (N, 2) numpy array.

The method 200 may include finding a grid within points and solving a graph problem. Points which form nodes on a graph may be obtained by using the dotter algorithm, but such a graph may have no edges. Therefore, the method 200 may include adding some edges to analyze them. For each dot of the scatter plot, the method 200 may determine or look for the closest neighbors, and create an edge connecting each of these neighbors to a reference dot. Using only a predefined number of dots may be simpler, compared to creating an edge between all pairs of points, which would result in millions of edges with overly complicated processing.

After the grid vertices detection process (232), the identified grid vertices from the dotter algorithm may be represented as dots on a scatter plot representation. The method 200 may include generating (in 233) a two-dimensional scatter plot 222 of dots, wherein the dots of the scatter plot represent the detected grid vertices of the grid arrangement of the original image graphical representation.

Figure 2C:
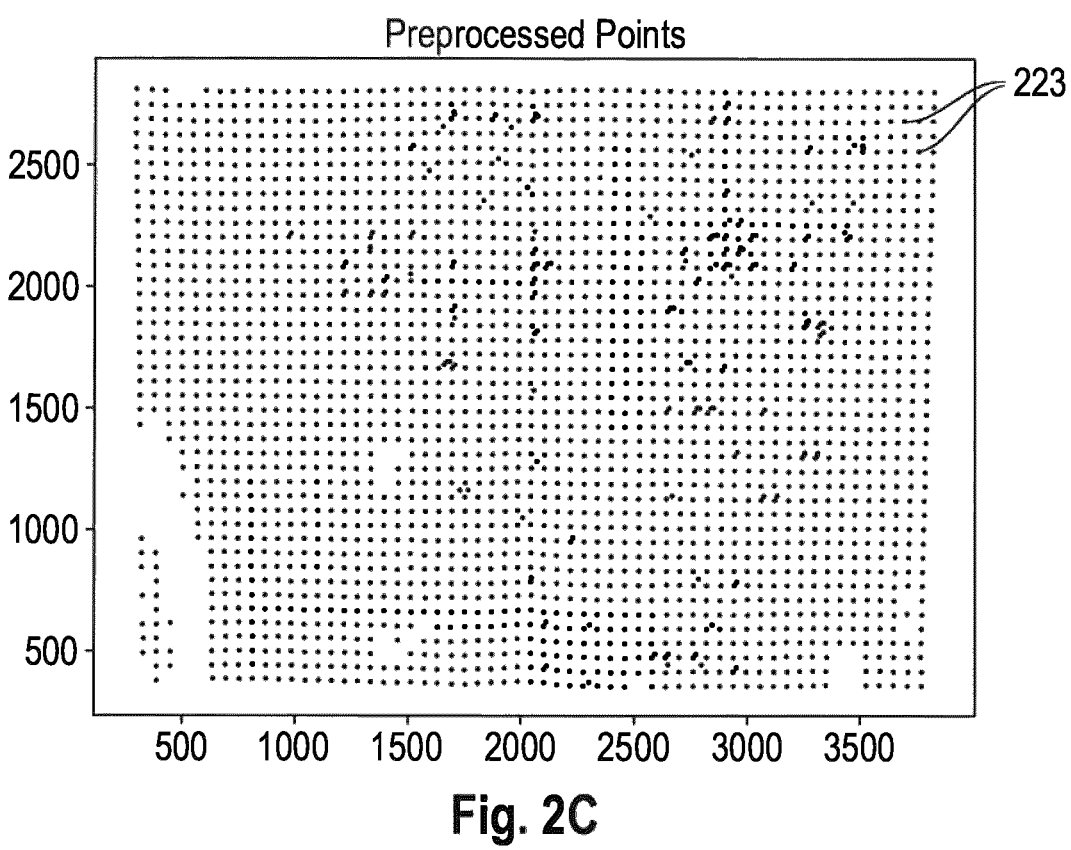
FIGS. 2C and 2D show representations of identified grid vertices on a two-dimensional scatter plot.
Figure 2D:
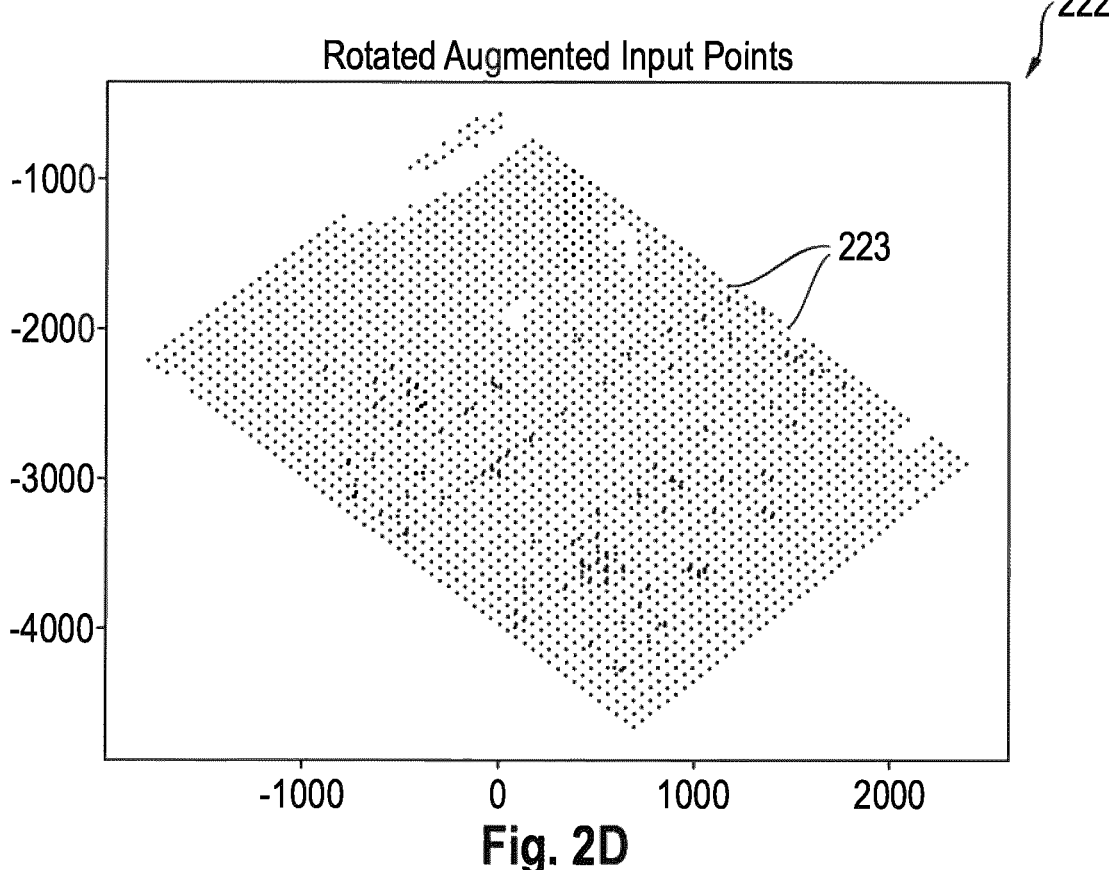

FIGS. 2C and 2D show respective representations two-dimensional scatter plot of dots 223. Generating the two-dimensional scatter plot 222 may include some preprocessing of the grayscale image mask. The dots of the scatter plot (from FIG. 2B) may be flipped about an axis (e.g. an x-axis) of the scatter plot to obtain the scatter plot of FIG. 2C. The scatter plot of FIG. 2C may be rotated by a predefined angle (e.g. 45 degrees clockwise to obtain the two-dimensional scatter plot 222 of dots 223 shown in FIG. 2D.

The pre-processing may be carried out after identifying the grid vertices and before a set of edges for each dot of the scatter plot are determined. The flipping of points along the X-axis may account for how images have (0, 0) in the top left corner instead of the bottom left corner.

After the preprocessing and generating the 2D scatter plot 233, the method 200 may further continue the process of establishing which grid vertices of the grid vertices identified by the CNN are actual grid vertices 108 of the original image 101. The method 200 may do this by removing false positives, inferring false negatives and/or determining how the points relate to each other. For example, the method 200 may include attempting to construct unit cells to obtain a grid arrangement using the identified dots 223, by determining which points for squares on the graphing paper and which squares are adjacent to each other (explained in processes 234 to 244).

Figure 2E:
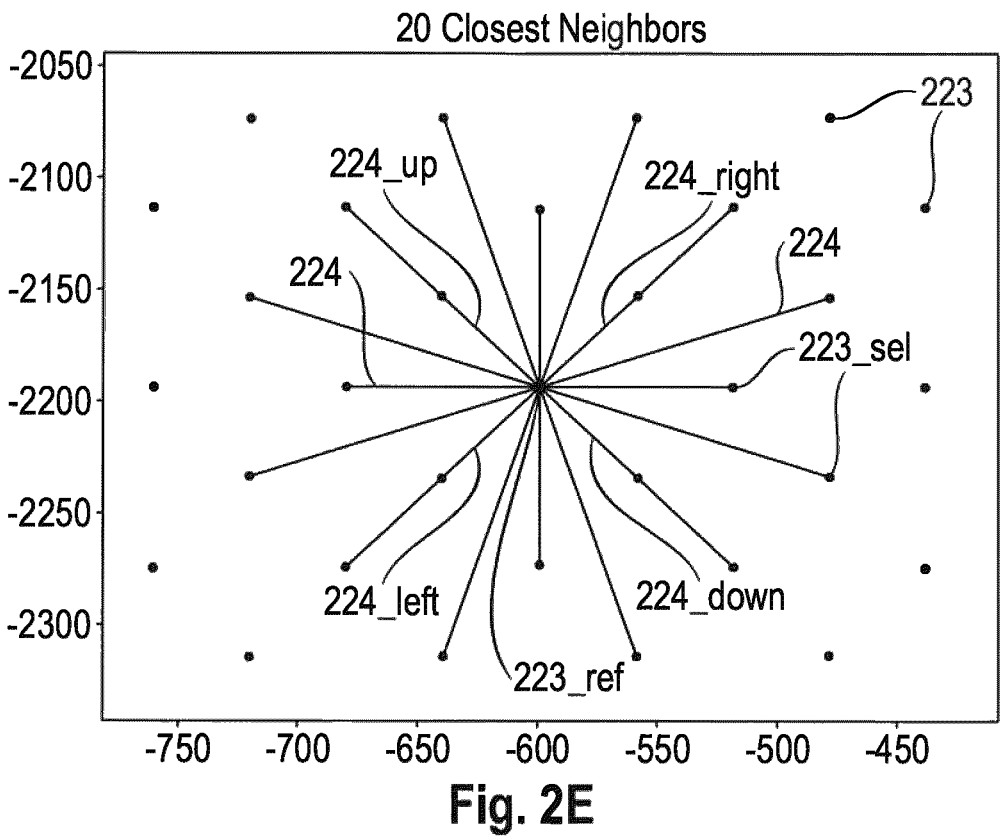
FIGS. 2E and 2F each show representations of a reference dot with selected neighboring dots.
Figure 2F:
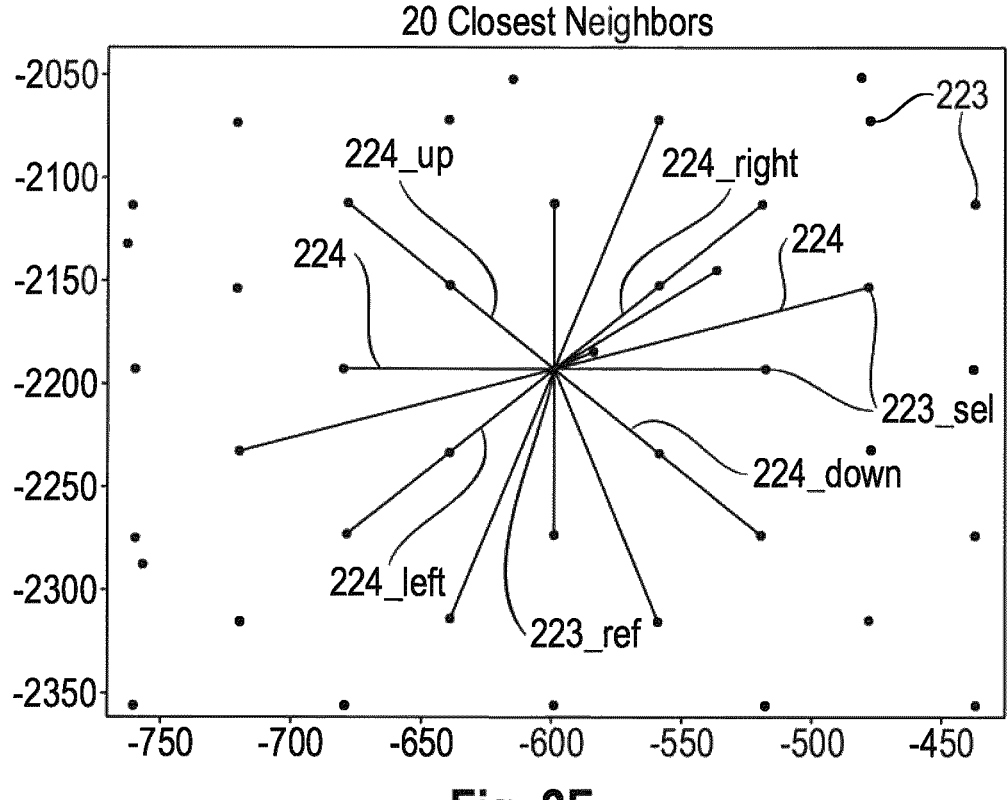

The method 200 may include determining (in process 234), for each dot 223 of the scatter plot 222, a set of edges for forming a unit cell of the grid arrangement. Determining the set of edges for each dot 223 of the scatter plot may include selecting (in process 235) a predefined number of dots 223_sel neighboring a reference dot 223_ref FIGS. 2E and 2F each show representations of a reference dot 223_ref with a predefined number of selected closest neighboring dots 223_sel. In this example, the predefined number may be 20, but any other suitable number may be used. FIG. 2E shows a representation if the input of identified grid vertices was perfect with the closest neighbors being evenly and accurately spaced. FIG. 2F shows a representation of the reference dot with 20 closest neighboring dots, including outlier points and the closest neighbors spaced at different distances to the reference dot.

Determining the set of edges for each dot 223 of the scatter plot 222 may further include generating (in process 236) an edge 224 between the reference dot 223_ref and each selected dot 223_sel. An edge may be a line joining two vertices (or two dots). Thus, a graph with 20 edges (such as that showed in FIG. 2E or 2F) may be generated.

Determining the set of edges for each dot 223 of the scatter plot 222 may further include selecting (in process 237) the edges for forming a unit cell 107 of the grid arrangement 102 based on a probability.

The method 200 may further include analyzing the edges 224 themselves. Determining the set of edges for each dot 223 of the scatter plot 222 may further include selecting edges 224_sel for forming a unit cell 107 of the grid arrangement 102 of the original image 101. For example, the method may have to narrow down, the number of potential edges from 20 per reference dot 223_ref to 4 edges per reference dot 223_ref.

In order to do this, selecting the edges for forming a unit cell 107 may include generating (in process 238) a scatter plot 225 comprising a plurality of edge data points 226. An edge data point 226 may represent metrics or parameters describing a relative position of a generated edge 224 with respect to a reference dot 223_ref The plurality of edge data points 226 represent all the edges generated with respect to each dot 223 of the scatter plot 222. Optionally, the two parameters may be the length of an edge between a neighboring dot and the reference dot, and an angle of orientation of the edge (such as a relative angle between the edge and a reference axis). Determining the metrics for each of the identified neighboring dots may result in an (M, 2) array of edge metrics, and the array may be referred to as edges-as-points to disambiguate them from the points themselves (which are an (N, 2) array).

Figures 2G, 2H:
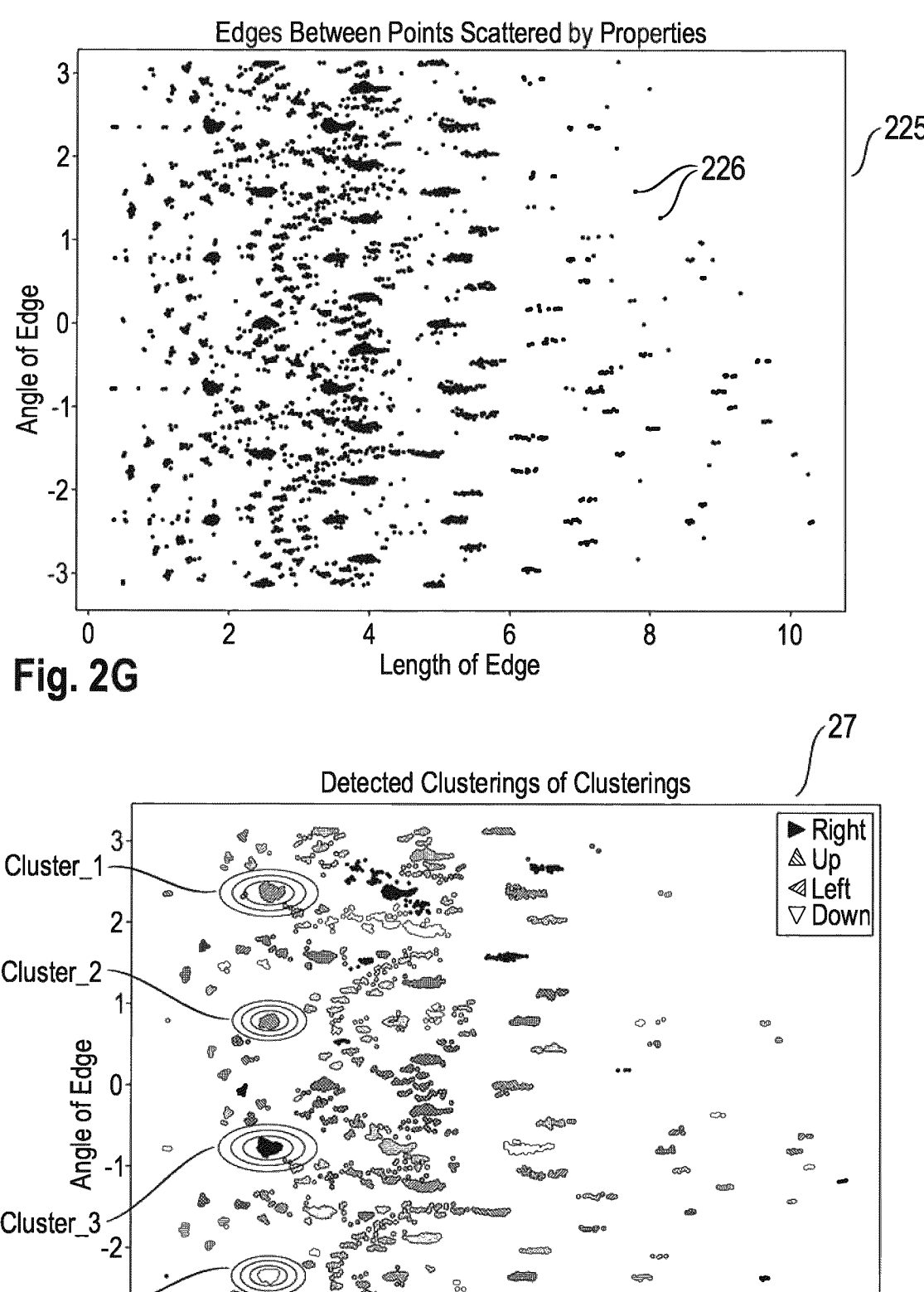
FIG. 2G shows a representation of a scatter plot comprising a plurality of edge data points.
FIG. 2H shows a representation of the results of a clustering process.

FIG. 2G shows a representation of the (second) scatter plot 225 comprising the plurality of edge data points (edge-as points) 226. The scatter plot 225 shows the relative angle of the edge in radians (y-axis) versus length of the edge (x-axis). It is noticeable from the scatter plot of FIG. 2G that there are four large clusters at X=2, which are spaced by roughly PI/2 along the y-axis. The lengths of the edges may be normalized and multiplied by pi in order for them to be comparable with the angles. These four clusters may represent the edges connecting a reference point 223_ref to its upper, lower, left and right neighbors on the graphing paper, and these are the edges that should be selected as they are the edges with the highest likelihood to be successful in forming a unit cell.

The method 200 may further include using (in process 239) a probability classifier (such as a gaussian classifier) to identify clusters of potential edge data points from the plurality of edge data points and to assign a probability to each potential edge of the identified cluster. For example, the Gaussians may be fit to the clusters of edges-as-points, thus providing a classifier for finding candidate edges. The method 200 may detect the clusters by running an algorithm such as DBScan on the edges-as-points 226, DBSCAN finds all the clusters, and the method 200 may include setting parameters to determine which clusters should be identified by DBScan. For example, the method 200 may identify which of the clusters found by DBScan correspond to the four clusters which correspond to the clusters of edge data points for forming a unit cell. The method 200 may exclude clusters with a cluster size that is below a threshold. For example, the method 200 may include clusters of approximately 4000 edge-as points. Thus, the method 200 may exclude all clusters that have fewer than 1000 edges-as-points to filter out outlier clusters. The method 200 may further define the four locations where clusters are to be expected, and identify the cluster closest to each of the defined locations.

Figure 2I:
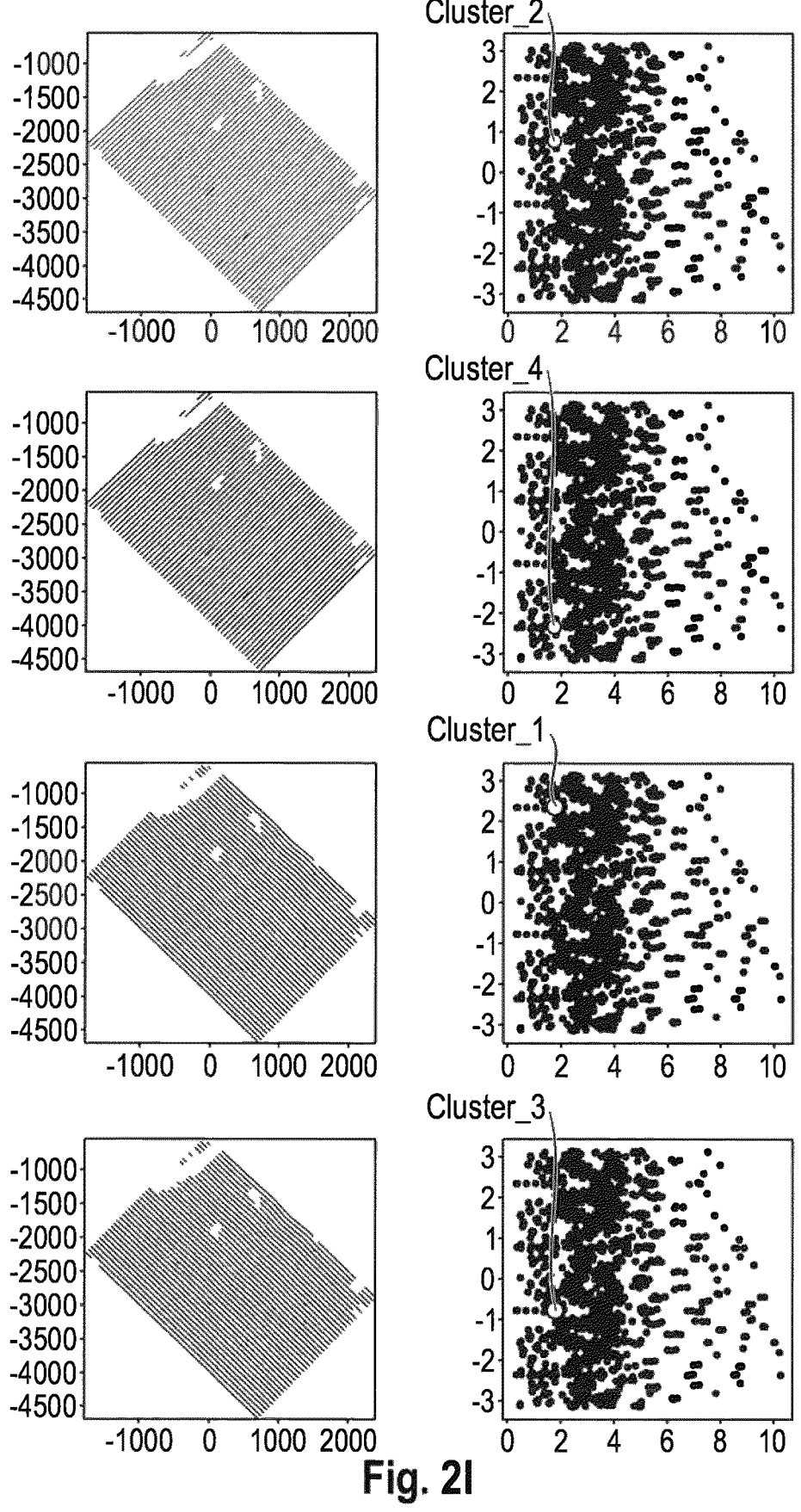
FIG. 2I plots of showing which edges were actually used to create clusters.

FIG. 2H shows a representation 227 of the results of a clustering of edges. For example, cluster 1 represents the candidate (potential) edges 224_left that are connecting a point to its left neighbor, cluster 2 represents the candidate (potential) edges 224_up that are connecting a point to its upper neighbor, cluster 3 represents the candidate (potential) edges 224_right that are connecting a point to its right neighbor, cluster 4 represents the candidate (potential) edges 224_down that are connecting a point to its lower neighbor. FIG. 2I shows the respective clusters with their respective edge-as points. Due to the use of the classifier, some of the 20 potential edges (shown in FIGS. 2E and 2F) may be eliminated as potential edges, such as the points that have an improbable length, or improbable angle of orientation for forming a unit cell.

Of the edges identified by the probability classifier, the edges for forming a unit cell 107 of the grid arrangement 102 may be selected based on a probability assigned to the potential edges by the probability classifier. For each reference point 223_ref, the probability classifier (e.g. the gaussians) may assign a probability that a neighboring edge may be the correct edge for forming a unit cell. For example, for each reference dot 223_ref, the probability classifier determines a probability of each of the potential edges being an up edge, a down edge, a right edge, or a left edge. For each reference dot 223_ref, the maximum likelihood edge for each potential edge for each gaussian is found. In other words, the most likely up edge, the most likely down edge, the most likely right edge and the most likely left edge may be selected from the potential edges. The selected maximum likelihood edges for one reference points 223_ref are shown on FIG. 2E as 224_up, 224_down, 224_right and 224_left respectively. Thus, the number of potential edges may be narrowed down from 20 to 4 edges per reference point (to form a square unit cell) by filtering out (removing) all other edges that have lower probabilities of being the actual edges forming part of the grid arrangement 102 of the original image 101. In the case of FIG. 2F, the clustering process may eliminate improbable edges, but there may be more than one candidate for a particular edge. For example, there may be 2 or 3 possible edges right edges 224_right identified by the clustering process. Since the probability classifier assigns (or a calculates) a probability for each of the edges, the method 200 includes selecting the right edge with the highest assigned probability to be the right edge 224_right for that reference point 223_ref. The process of selecting maximum likelihood edges and removing all other edges having lower probabilities may be repeated for every dot 223 of the scatter plot 222. It may be understood that in these examples, the unit cell is a square, and therefore 4 edges are identified per reference point. However, the unit cells may have other shapes, e.g. polygonal shapes, and thus the method may include determining for each dot of the scatter plot, n-maximum likelihood edges for forming an n-sided polygon.

After determining (in processes 234 to 239) the set of edges for forming the unit cell 237, the method 200 may further include constructing (in process 240), for each dot 223 of the scatter plot 222, a unit cell of the grid arrangement based on the determined set of (maximum likelihood) edges. The method 200 may include tracing, starting with each reference dot 223_ref, a path of a unit cell along the selected edges, wherein the selected edges are maximum likelihood edges for forming the unit cell. The path may be a predefined path. For example, for every dot, the tracing may follow a left, up, right and back down path to form a closed unit cell. For example, starting from the reference vertex 223_ref (or a starting vertex), the method includes finding a continuous path from a starting vertex to an end vertex. If the path returns or ends at the starting dot (or vertex), a closed unit cell (e.g. a square) has been detected successful. Edges that are not a part of a closed square path may be removed. The code may follow the most likely edges when making steps but it may also check the overall likelihood of the square itself, after it finds it. For example, if the four edges of a square had probabilities of, for example, 89%, 92%, 32% and 97%, the probability of the unit cell being accurate unit cell is assigned the lowest probability of the edges (e.g. 32% in this case). If the minimum probability falls below a threshold, the unit cell may be rejected. The process for constructing the unit cells may be referred to as executing a stepwise Square Finder via a maximum likelihood path since the method includes following a maximum likelihood square path starting from every point 223 using only the maximum likelihood edges.

Figure 2J:
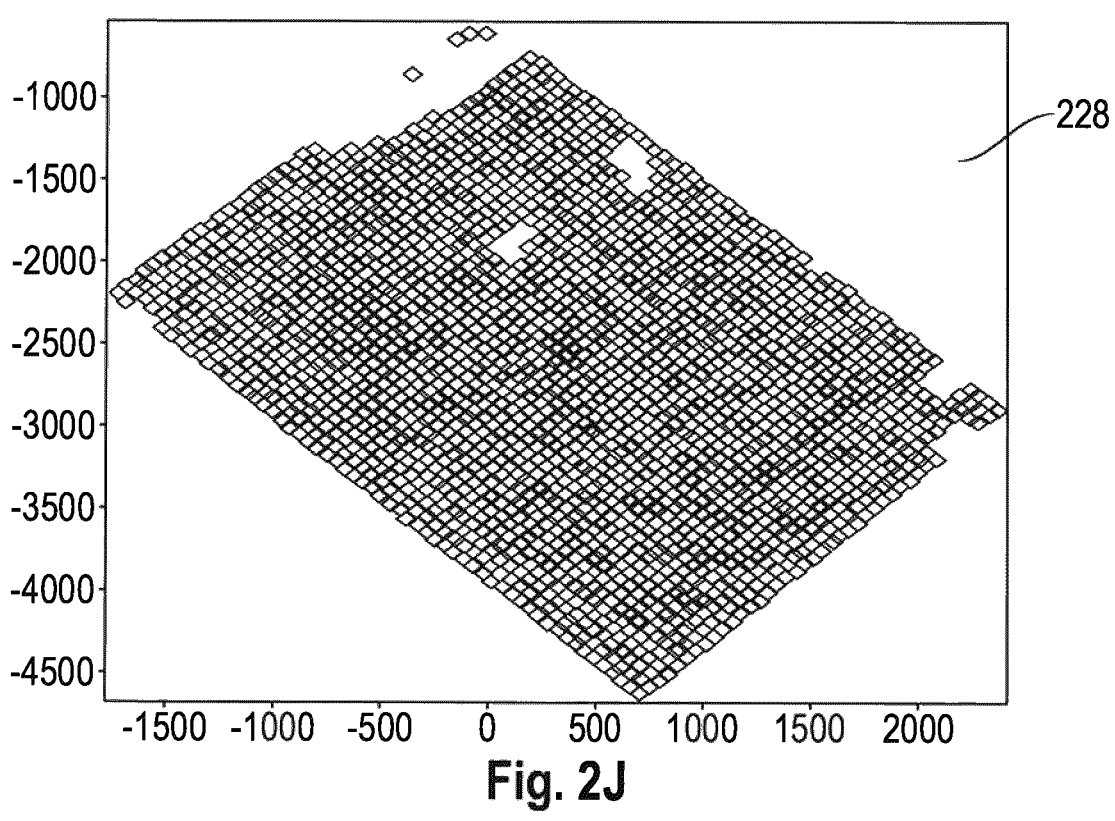
FIG. 2J shows a representation of a network of unit cells having a closed path.

After determining the maximum likelihood edges for each reference dot 223_ref, and removing false edges, the method 200 may thereafter include constructing (in process 241) a network of closed unit cells, the unit cells that have been identified as having a closed path. FIG. 2J shows a representation 228 of a network of unit cells having a closed path. The cells would have met the criteria of the meeting or exceeding the minimum threshold probability and forming a closed unit cell. The corners of the detected squares have been deliberately offset by small random values only for the purpose of allowing the reader to see the individual squares. Without the deliberate offset, the network of unit cells would form a solid and continuous net.

The method 200 may further include determining (in process 242) the largest network of unit cells for forming the grid arrangement using a breadth-first search (BFS) algorithm. In this cleanup process, the detected squares may create a network of points, which may be equivalent to the grid on the graphing paper. However, there may be several different "grids", one large grid (the correct one) and some tiny ones (outliers consisting of one or two squares) (as seen in FIG. 2J). The BFS algorithm may be used along the remaining edges to identify the maximum network of squares and disregard the points and/or edges belonging to the tiny outlier networks. Thus, a single connected network of points may be obtained.

The method 200 may further include identifying (in process 243) missing unit cells from the grid arrangement. Having a single connected network of points may allow for a variety of BFS traversals of the graph in order to identify the points' mutual locations with respect to one another. In this way, patches with missing points (false negatives from the Dotter algorithm) may be identified.

Figure 2K:
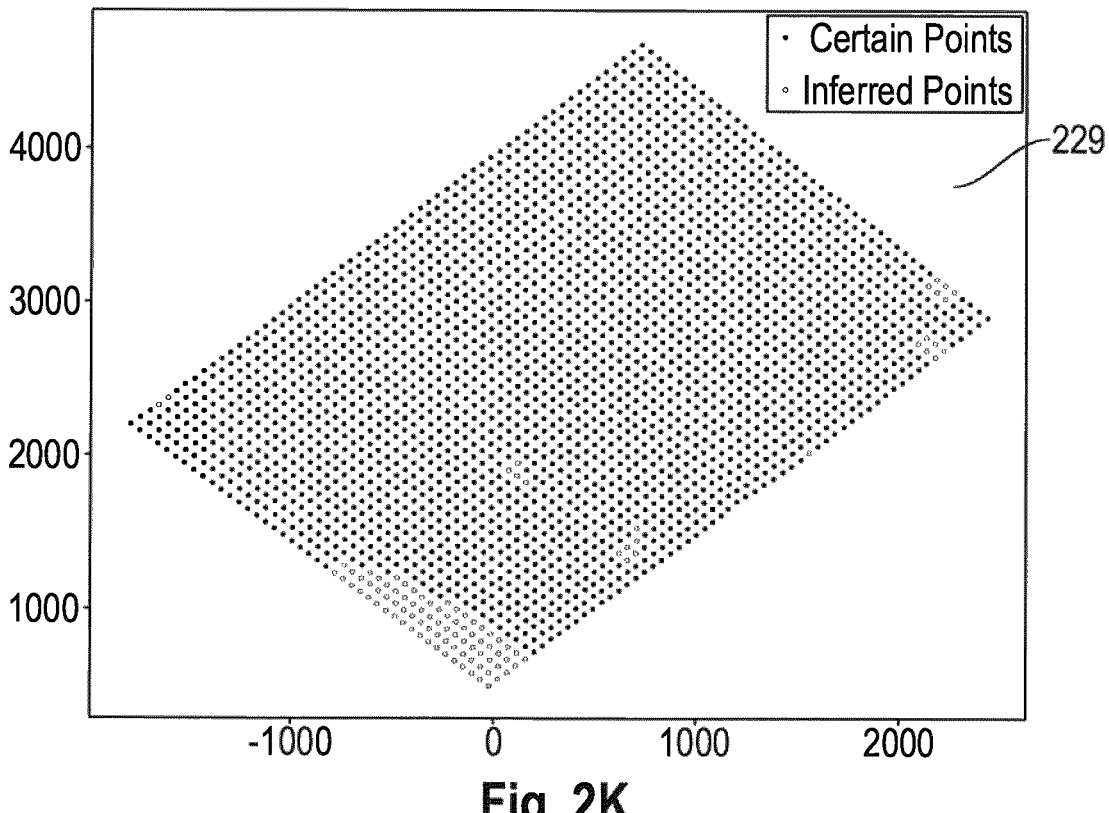
FIG. 2K shows a representation of a grid arrangement including derived points and inferred points.

After identifying the missing patches, their surrounding points may be used to infer the locations of the missing points. The method 200 may include determining (In process 244) position information of vertices of the missing unit cells using linear regression, e.g. (inferring missing unit cells). FIG. 2K shows a representation 229 of a grid arrangement including the derived points and inferred points.

A complete (H, W, 2) array of coordinates of the grid-intersections may be derived by the method 200, and post-processing may be carried out, wherein the representation 229 may be rotated by the predefined angle and rotated over the x-axis to undo the rotation and flipping process of the earlier pre-processing. The final coordinates describing the position information of the derived grid vertices of the original image may then be output as a finished array. These coordinates (position information) may be used to determine the transformation relationship as described in connection with process 110 and 245 of the methods 100, 200.

As described in connection with FIGS. 1A to 1G, the method 200 may further include determining (246, 120) position formation of the plurality of pixels, and applying (247, 130) data information sampled at the plurality of pixels of the unit cell of the original image graphical representation to a plurality of pixels of the unit cell of the reference grid arrangement. The method 200 may further include generating or outputting a undistorted image 112 including an undistorted graphical representation.

Figure 3:
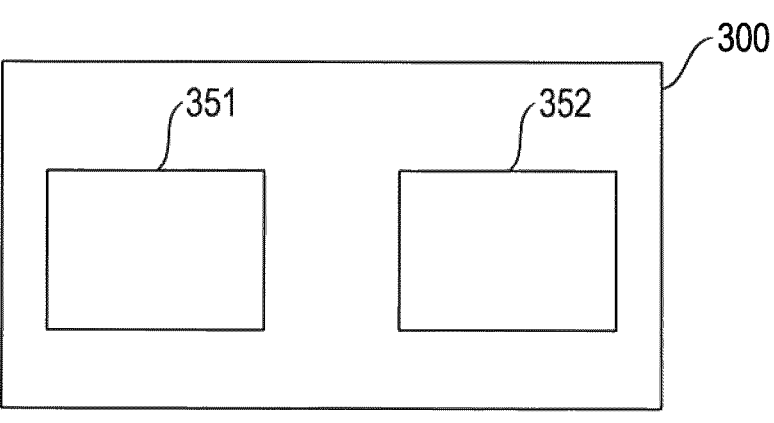
FIG. 3 shows an illustration of a computer, device, apparatus or machine for performing the method described in the examples.

The various examples described herein relate to a computer-readable storage medium, comprising computer-readable instructions, which when executed by a computer, causes the computer to perform the method 100, 200 described in connection with FIGS. 1A to 2K. The various examples may relate to a computer, device, apparatus, telecommunication device or a machine capable of executing instructions of the computer-readable storage medium. FIG. 3 shows an illustration of a computer 300, device, apparatus or machine configured to perform the methods 100, 200 described in connection with FIGS. 1A to 2K. The computer 300 may include the computer-readable storage medium. Optionally, the computer 300 may include an imaging device 352 (e.g. a digital camera) for creating an image of a paper-based graphical representation. Alternatively, additionally or optionally, the computer 300 may include an input to receive the digital data related to the original image.

Figure 4A:
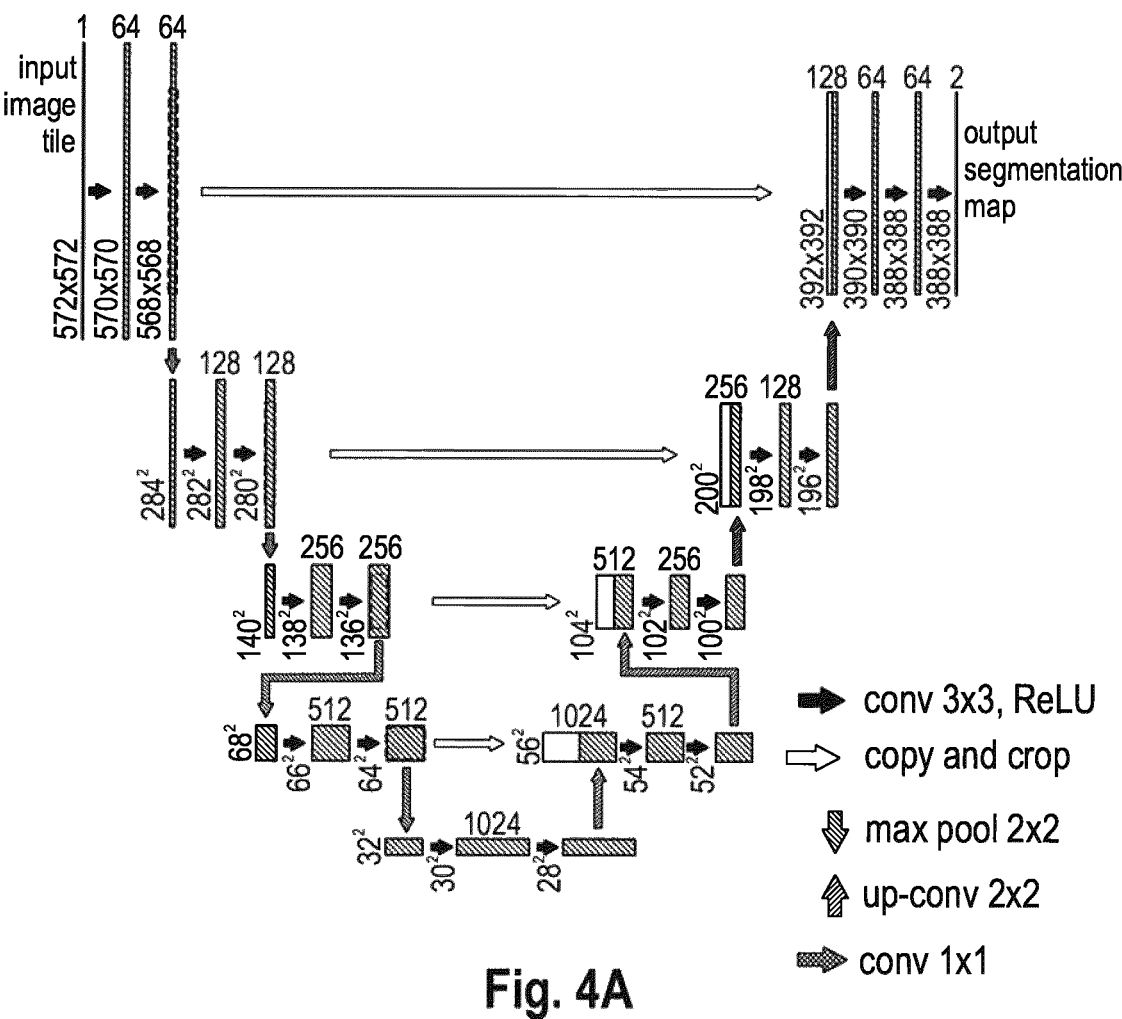
FIG. 4A shows an example of a Convolutional Neural Networks (CNN) for detecting grid vertices.
Figure 4B:
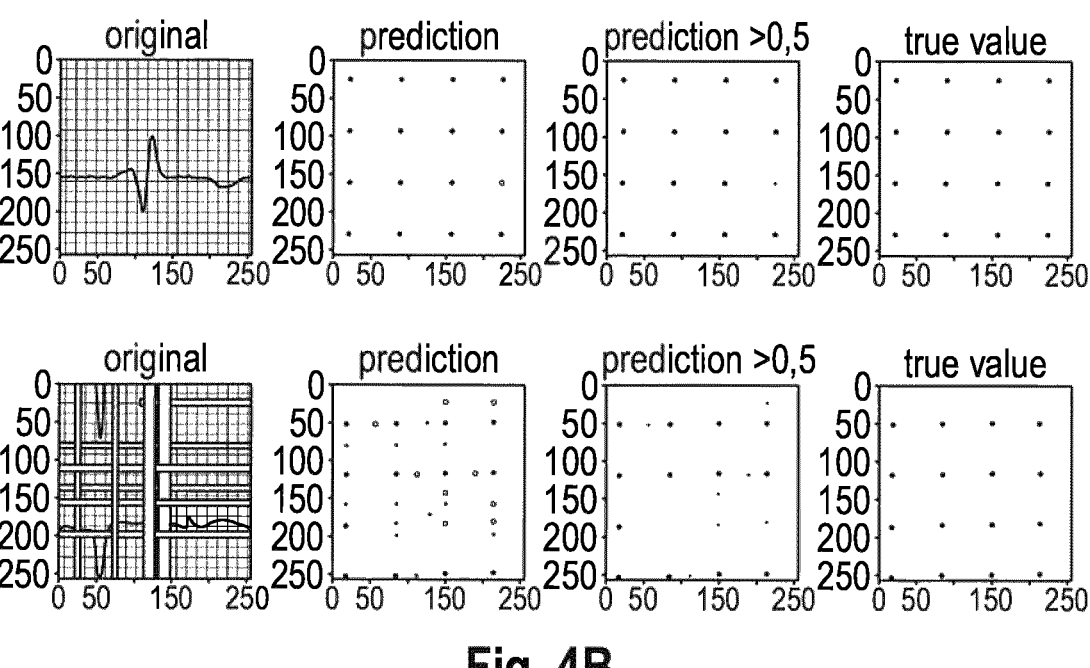
FIGS. 4B to 4C show images of CNN training and validation data.
Figure 4C:
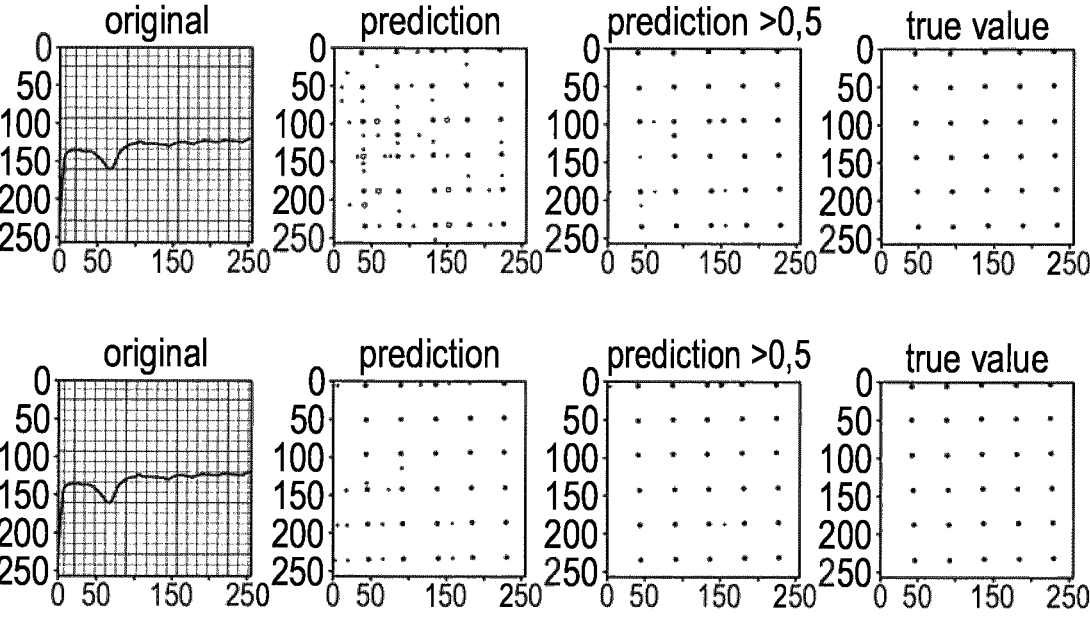

FIG. 4A shows an example of a Convolutional Neural Networks (CNN) called u-net that may be used for detecting grid vertices. FIGS. 4B to 4C show images of CNN trainings and validation data, wherein the CNN may be trained with images of ECG waveforms and grid vertices to be able to classify and identify grid vertices. After training the network, the trained network may be used to identify or recognize grid vertices in the original image graphical representation and to classify the grid vertices as dots with a high epoch accuracy.

Figure 5:
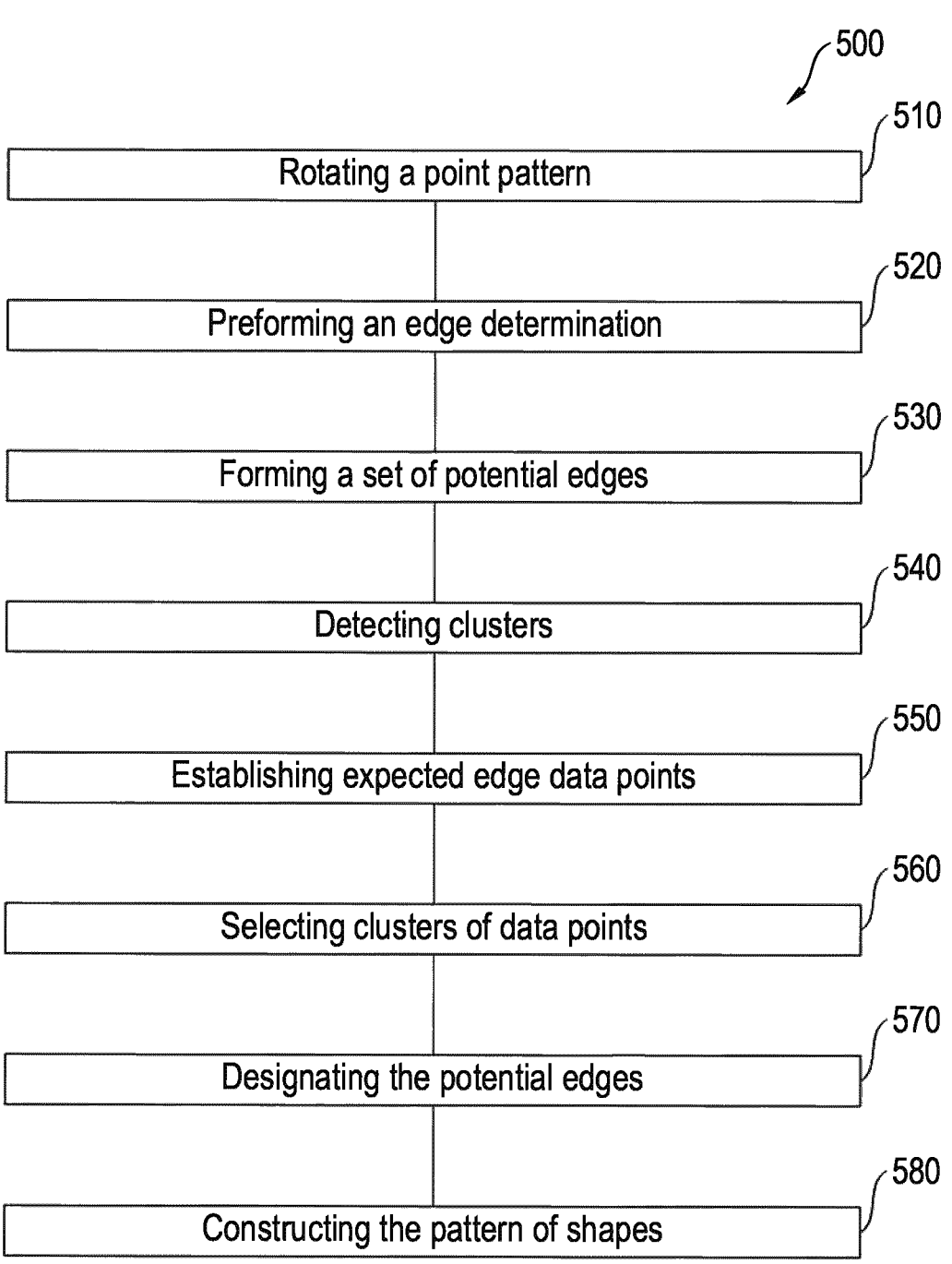
FIG. 5 shows a flow chart of a method for constructing a pattern of shapes.

The various examples described herein relate to method for constructing a pattern of shapes. FIG. 5 shows a flow chart of a method 500 for constructing a pattern of (polygonal) shapes from a two-dimensional dot pattern, each shape being defined by a number of interconnected edges. The method 500 may include one or more or all of the features described in connection with FIGS. 1A to 4C.

The method 500 may include rotating (in process 510) the dot pattern by a predefined angle, performing (in process 520) an edge determination for each dot of the dot pattern by identifying a predefined number of closest neighboring dots, and determining possible edges. Each possible edge may correspond to a line connecting the considered dot of the dot pattern and a respective one of its closest neighbors. Each possible edge may be defined by a length and by an angle of orientation. The method may further include forming (in process 530) a set of possible edges obtained from the edge determination for all dots in the dot pattern, wherein each edge is represented by a data dot.

The method may further include detecting (in process 540) clusters of data dots in the set of possible edges, establishing (in process 550) expected edge data dots, each expected edge data dot being defined by the length of a different edge in the shape and by the angle of orientation of that edge, selecting (in process 560) clusters of data dots from the set of possible edges which are closest to each of the expected edge data dots, designating (in process 570) the possible edges represented by the selected clusters of data dots as selected edges of the shapes, and constructing (in process 580) the pattern of shapes from the selected edges. Forming the set of possible edges may include generating a two-dimensional plot comprising the data dots representing the possible edges.

Additionally or optionally, the method may further include removing detected clusters which includes a number of data dots which lies below a predefined threshold. The method may further include fitting a Gaussian distribution to each of the selected clusters, and using the Gaussian fit as a classifier to determine the selected edges among the possible edges of a respective dot of the dot pattern as established during the edge determination.

Additionally or optionally, the method may further include performing a shape verification for each dot of the dot pattern by starting at a starting dot of the dot pattern, forming a path by concatenating selected edges in accordance with the contour of the shape, each selected edge belonging to a different cluster of data dots. The method may further include discarding the selected edges forming the path from the designated selected edges if the path does not correspond to a closed path ending at the starting dot. Additionally, the method may further include discarding paths that deviated from an expected shape of the path. For example, if a path following a diamond shape may be discarded because it deviates from the square shape, even if the path corresponds to the closed path. The path may be formed by choosing a selected edge at every consecutive dot which has, based on the classifier, the highest probability of being the correct edge in order to form the path in accordance oriented with the contour of the shape.

Additionally or optionally, the method may further include localizing a blank area within the two-dimensional dot pattern which does not comprise any dots, and generating dots in the blank area by inferring their positions based on the pattern of dots in a region surrounding the blank area, preferably using linear regression. Detecting clusters of data dots in the set of possible edges may include identifying clusters of dots in a two-dimensional dot plot in which, each dot defined by the length of the edge and by the angle of orientation of the edge, with the x-axis of the plot denoting the length of an edge and the y-axis of the plot denoting an angle of orientation of an edge.

For determining position information of the plurality of grid vertices of the graphical representation of the original image, the gridder algorithm's purpose is to figure out which dots detected as gridline intersections identifiable in an image of a paper-based graphical representation form the actual grid of an image of a paper-based graphical representation, e.g. an ECG. The gridder algorithm does this by removing the false positives, inferring false negatives and figuring out how the points relate to each other (which points form the squares on the graphing paper and which of these squares are adjacent to each other).

Extracting Points

The first step is to process the input, which is a grayscale image mask, where the points are represented as bright spots on a black background (which represents, so to say, 'nothing'). The current system of extracting points from the input is done as follows:

The image is thresholded for RGB values over 150. This forms white patches on a black background.

The midpoint of each patch is then identified as a point.

The top 2520 largest points are found, the rest are removed.

The top 2520 largest points are passed onto the next stage.

Instead of the midpoint of the patch the skilled person could use the average location of the white pixels. Compute a weighted average location of the spot, weighing the pixel location by their intensity in the mask. The output of this stage are float coordinates of points in an (N, 2) numpy array. Optionally, this stage can also add potential augmentations used for testing the resilience of the program. The command line arguments can be used to configure how many points should be dropped (simulating false negatives) and how many random garbage points should be added (simulating false positives).

Preprocessing

As a preprocessing step one flips the points along the X axis (to account for how images have 0,0 in the top left corner instead of the bottom left) and rotate the points by 45 degrees clockwise.

Finding Candidate Edges

Finding the grid within the points is a graph problem and it is solved as a graph problem. At this stage one has the points (which form nodes on the graph), but the graph has no edges yet. Accordingly, in the following it is described how some edges are added and analyzed.

Rather than creating an edge between all pairs of points which would result in millions of edges and any processing would be too complicated, one finds the 20 closest neighbors to each point and creates an edge connecting these neighbors.

Clustering of Edges

Once a graph with edges is there, one can analyze the edges themselves. There are two metrics for each edge: the length of the edge and the angle of the edge. This results in an (M, 2) array of edge metrics, referred to as edges-as-points to disambiguate them from the points themselves (which are an (N, 2) array). Following that, a scatter plot of these edges-as-points is made.

Clusters can be detected by running DBScan on the edges-as-points. DBSCAN finds all the clusters. Accordingly, the skilled person has to identify which of the found clusters correspond to the four clusters the skilled person is looking for.

First, one excludes all clusters that have fewer than 1000 edges-as-points in them to filter out outlier clusters. Second, the four locations are defined where one expects the clusters to be and one will readily finds the cluster closest to each of the locations.

One then fits Gaussians to the clusters of edges-as-points, thereby resulting in a classifier for candidate edges.

Stepwise Square Finder Via Maximum Likelihood Path

In this step one filters out edges that are not part of the graphing paper grid. There are 20 edges per point, but there can be at most 4 (graphing paper has squares).

First, one finds the maximum likelihood edge for each point for each Gaussian. This means one reduces the edges down to 4 per point: the most likely up edge, the most likely down edge, the most likely right edge and the most likely left edge. All other edges are removed.

Second, one follows a maximum likelihood square path from every point (that is, one starts at every point and follows a left, up, right and back down path) using only the maximum likelihood edges found in step 1. If this path takes one back to the point from which one started, this means a square is detected. All edges that were not a part of some square path are removed.

Cleanup

At this point one may "clean up". The squares which were detected create a network of points which is equivalent to the grid on the graphing paper. An issue may be that there may be several different "grids", usually one large grid (the correct one) and some tiny ones (outliers consisting of one or two squares). However, one may use BFS along the remaining edges to identify the maximum network of squares and disregard the points and edges belonging to the tiny outlier networks. Accordingly, a single connected network of points will remain.

The benefit of having a single connected network of points is that one can use a variety of BFS traversals of the graph in order to identify the Points' mutual locations with respect to one another. This allows one to identify patches where one has a missing point. One finds the missing patches and use their surrounding points to infer the locations of the missing points using Linear Regression.

Postprocessing

At this point one has a complete (H, W, 2) array of coordinates of the grid intersections. The 45 degree rotation is removed and the X-axis flip that was performed in the preprocessing step finished the array.

One expects 60×42 (2520) points on the grid paper. The lengths of all edges are normalized and divided by PI in order for them to be comparable with the angles. This is because one is looking for clusters of roughly 4000 edges-as-points.

Additionally or optionally, the method may include generating a template comprising an undistorted pattern of the shapes, mapping a shape from the template onto a corresponding shape in the pattern of shapes by mapping characteristic features of the shape in the template onto corresponding characteristic features of the corresponding shape in the pattern of shapes according to a transformation rule, mapping a unit cell within the shape of the template onto a corresponding unit cell within the shape in the pattern of shapes by applying the transformation rule to the unit cell, sampling the distorted image of the unit cell within the shape of the pattern of shapes to obtain a color value and transferring the sampled color value onto the corresponding unit cell within the shape of the template.

The invention is further characterized by the following items.

Item 1: A method for generating an image comprising a graphical representation, the method comprising:
determining a transformation relationship for a unit cell of a graphical representation of an original image, the original image graphical representation comprising a grid arrangement comprising a plurality of unit cells,
wherein the transformation relationship is based on position information of grid vertices of the unit cell of the original image graphical representation and position information of grid vertices of a unit cell of a reference grid arrangement of the image to be generated;
determining position information of one or more pixels of the unit cell of the original image graphical representation based on the transformation relationship; and applying data information sampled at the one or more pixels of the unit cell of the original image graphical representation to one or more pixels of the unit cell of the reference grid arrangement.

Item 2: The method of item 1, wherein the original image is an image of a paper-based graphical representation.

Item 3: The method of item 2, wherein the original image graphical representation comprises a waveform represented on the grid arrangement, wherein the waveform comprises at least one of an electrocardiogram waveform, a blood pressure waveform, a waveform representing a measurable parameter.

Item 4: The method of any of items 1 to 3, wherein the reference grid arrangement and the grid arrangement of the original image are of the same size.

Item 5: The method of any of items 1 to 4, wherein the position information of each pixel of the unit cell of the original image graphical representation is determined based on a transformation of the position information of a corresponding pixel of the unit cell of the reference grid arrangement using the transformation relationship.

Item 6: The method of any of items 1 to 5, wherein the transformation relationship is determined based on a mapping of the position information of the grid vertices of the unit cell of the reference grid arrangement to the position information of grid vertices of the unit cell of the original image graphical representation.

Item 7: The method of any of items 1 to 6, comprising repeating the processes of determining a transformation relationship and applying sampled data to each unit cell of a plurality of unit cells of the reference grid arrangement to form the undistorted graphical representation.

Item 8: The method of any of items 1 to 7, wherein the sampled data information comprises color value information representing waveform data of the original image graphical representation.

Item 9: The method of any of items 1 to 9, comprising determining position information of the plurality of grid vertices of the original image graphical representation, wherein determining the position information comprises:

generating a two-dimensional scatter plot of dots, wherein the dots of the scatter plot represent detected grid vertices of the grid arrangement of the original image graphical representation;

determining, for each dot of the scatter plot, a set of edges for forming a unit cell of the grid arrangement; and constructing, for each dot of the scatter plot, a unit cell of the grid arrangement based on the determined set of edges.

Item 10: The method of item 9, wherein the dots of the scatter plot are rotated and flipped about an axis of the scatter plot before the set of edges for each dot of the scatter plot are determined.

Item 11: The method of item 8 or 10, wherein determining the set of edges for each dot of the scatter plot comprises:

selecting a predefined number of dots neighboring a reference dot;

generating an edge between the reference dot and each selected dot;

selecting edges for forming a unit cell of the grid arrangement based on a probability assigned to the generated edges.

Item 12: The method of item 11, wherein selecting the edges for forming a unit cell comprises generating a plot comprising a plurality of edge data points, each edge data point representing parameters describing a relative position of the generated edge with respect to the reference dot; and using a probability classifier to identify clusters of edge data points from the plurality of edge data points and to assign a probability to each edge of the identified cluster.

Item 13: The method of item 11 or 12, wherein constructing a unit cell comprising tracing, starting with each reference dot, a path of a desired unit cell along the selected edges, wherein the selected edges are maximum likelihood edges for forming the unit cell; the method further comprising constructing a network of unit cells with unit cells having a closed path.

Item 14: The method of item 13, further comprising determining the largest network of unit cells for forming the grid arrangement using a breadth-first search algorithm;

identifying missing unit cells from the grid arrangement; and determining position information of vertices of the missing unit cells using linear regression.

Item 15: A computer-readable storage medium, comprising computer-readable instructions, which when executed by a computer, causes the computer to perform the method of any of items 1 to 14.

Item 16: A method for constructing a pattern of shapes from a two-dimensional point pattern, each shape being defined by a number of interconnected edges, wherein the method comprises:

rotating the point pattern by a predefined angle;

performing an edge determination for each point of the point pattern by:

identifying a predefined number of closest neighboring points; and determining potential edges, each potential edge corresponding to a line connecting the considered point of the point pattern and a respective one of its closest neighbors, forming a set of potential edges obtained from the edge determination for all points in the point pattern, wherein each edge is represented by a data point defined by the length of the edge and by the angle of orientation of the edge;

detecting clusters of data points in the set of potential edges;

establishing expected edge data points, each expected edge data point being defined by the length of a different edge in the shape and by the angle of orientation of that edge;

selecting clusters of data points from the set of potential edges which are closest to each of the expected edge data points;

designating the potential edges represented by the selected clusters of data points as selected edges of the shapes;

constructing the pattern of shapes from the selected edges.

Item 17: The method of item 16, wherein forming the set of potential edged includes generating a two-dimensional plot comprising the data points representing the potential edges.

Item 18: The method of item 16 or 17, further comprising: removing detected clusters which comprise a number of data points which lies below a predefined threshold.

Item 19: The method of any one of items 16 to 18, further comprising:

fitting a Gaussian distribution to each of the selected clusters; and using the Gaussian fit as a classifier to determine the selected edges among the potential edges of a respective point of the point pattern as established during the edge determination.

Item 20: The method of item 19, further comprising:

performing a shape verification for each point of the point pattern by:

starting at a starting point of the point pattern, forming a path by concatenating selected edges in accordance with the contour of the shape, each selected edge belonging to a different cluster of data points; and discarding the selected edges forming the path from the designated selected edges if the path does not correspond to a closed path ending at the starting point.

Item 21: The method of item 20, wherein the path is formed by choosing a selected edge at every consecutive point which has, based on the classifier, the highest probability of being the correct edge in order to form the path in accordance oriented with the contour of the shape.

Item 22: The method of any one of items 16 to 21, further comprising:

localizing a blank area within the two-dimensional point pattern which does not comprise any points; and generating points in the blank area by interring their positions based on the pattern of points in a region surrounding the blank area, preferably using linear regression.

Item 23: The method of any one of items 16 to 22, wherein detecting clusters of data points in the set of potential edges comprises identifying clusters of points in a two-dimensional point plot in which, each point defined by the length of the edge and by the angle of orientation of the edge, with the x-axis of the plot denting the length of an edge and the y-axis of the plot denoting an angle of orientation of an edge.

Item 24: A method for undistorting a distorted image comprising a pattern of shapes, the method comprising:

generating a template comprising an undistorted pattern of the shapes;

mapping a shape from the template onto a corresponding shape in the pattern of shapes by mapping characteristic features of the shape in the template onto corresponding characteristic features of the corresponding shape in the pattern of shapes according to a transformation rule;

mapping a subregion within the shape of the template onto a corresponding subregion within the shape in the pattern of shapes by applying the transformation rule to the subregion;

sampling the distorted image in the subregion within the shape of the pattern of shapes to obtain a color value;

transferring the sampled color value onto the corresponding subregion within the shape of the template.

Item 25: The method of item 24, wherein the shape corresponds to a rectangle, preferably a square.

Item 26: The method of item 25, wherein the square has a size of 64×64 pixels.

Item 27: The method of any of items 24 to 26, wherein the subregion within the shape of the template corresponds to a pixel.

Item 28: The method of any of items 24 to 27, wherein the characteristic feature of a shape corresponds to a corner of the shape.

Item 29: The method of any of items 24 to 28, wherein the transformation rule defines a linear transformation which is preferably described by a transformation matrix.

Having described in detail embodiments of the present invention, it is understood that the invention defined by the appended claims is not to be limited by particular details set forth in the above description, as many apparent variations thereof are possible without departing from the spirit or scope thereof.

The invention claimed is:

1. A method for producing an undistorted image from a distorted original image comprising a graphical representation on an original grid arrangement with a plurality of unit cells that forms a background onto which graphical information is recorded, based on a reference grid arrangement comprising a plurality of undistorted unit cells creatable on a blank image, the method comprising:

creating the reference grid arrangement by associating the plurality of undistorted unit cells on the blank page with corresponding unit cells of the original grid arrangement derivable from the distorted original image; repeating for each unit cell, referred to as current unit cell, of the reference grid arrangement;

determining a transformation relationship based on position information of grid vertices of the current unit cell, referred to as target unit cell, and position information of grid vertices of a corresponding unit cell, referred to as source unit cell, of the original grid arrangement in the distorted original image;

determining position information in a source unit cell corresponding to one or more pixels of the current unit cell, referred to as target unit cell, using the transformation relationship; and supplying data information sampled in the source unit cell, using the position information determined in the source unit cell, to the corresponding one or more pixels of the target unit cell to produce the undistorted image.

2. The method of claim 1, wherein the position information determinable in the source unit cell corresponding to a pixel of the one or more pixels of the current unit cell comprises a location of a single pixel in the original image graphical representation.

3. The method of claim 1, wherein the original image is an image of a paper-based graphical representation.

4. The method of claim 3, wherein the original image graphical representation comprises a waveform represented on the original grid arrangement, and wherein the waveform comprises a waveform representing a measurable parameter, such as an electrocardiogram waveform.

5. The method of claim 1, wherein the reference grid arrangement and the original grid arrangement of the original image are of the same size.

6. The method of claim 1, wherein the position information of each pixel of the unit cell of the original image graphical representation is determined based on a transformation of the position information of a corresponding pixel of the unit cell of the reference grid arrangement using the transformation relationship.

7. The method of claim 1, wherein the transformation relationship is determined based on a mapping of the position information of the grid vertices of the unit cell of the reference grid arrangement to the position information of grid vertices of the unit cell of the original image graphical representation.

8. The method of claim 1, comprising repeating the processes of determining the transformation relationship and applying sampled data to each unit cell of the plurality of unit cells of the reference grid arrangement to form the undistorted image.

9. The method of claim 1, wherein the sampled data information comprises color value information representing waveform data of the original image graphical representation.

10. The method of claim 9, wherein determining the set of edges for each dot of the scatter plot comprises:

selecting a predefined number of dots neighboring a reference dot;

generating an edge between the reference dot and each selected dot; and selecting edges for forming a unit cell of the grid arrangement based on a probability assigned to the generated edges.

11. The method of claim 10, wherein selecting the edges for forming a unit cell comprises:

generating a plot comprising a plurality of edge data points, each edge data point;

representing parameters describing a relative position of the generated edge with respect to the reference dot; and using a probability classifier to identify clusters of edge data points from the plurality of edge data points and to assign a probability to each edge of the identified cluster.

12. The method of claim 10, wherein constructing a unit cell comprising tracing, starting with each reference dot, a path of a desired unit cell along the selected edges, wherein the selected edges are maximum likelihood edges for forming the unit cell; the method further comprising constructing a network of unit cells with unit cells having a closed path.

13. The method of claim 12, further comprising:

determining the largest network of unit cells for forming the grid arrangement using a breadth-first search algorithm;

identifying missing unit cells from the grid arrangement; and determining position information of vertices of the missing unit cells using linear regression.

14. The method of claim 1, comprising determining position information of the plurality of grid vertices of the original image graphical representation, wherein determining the position information comprises:

generating a two-dimensional scatter plot of dots, wherein the dots of the scatter plot;

representing detected grid vertices of the grid arrangement of the original image graphical representation;

determining, for each dot of the scatter plot, a set of edges for forming a unit cell of the grid arrangement; and constructing, for each dot of the scatter plot, a unit cell of the grid arrangement based on the determined set of edges.

15. The method of claim 14, wherein the dots of the scatter plot are rotated and flipped about an axis of the scatter plot before the set of edges for each dot of the scatter plot are determined.

16. A non-transitory computer-readable storage medium, comprising computer-readable instructions, which when executed by a computer, causes the computer to perform the method of claim 1.

\*  \*  \*  \*  \*